(12) United States Patent
Cannon et al.

(10) Patent No.: US 9,095,840 B2
(45) Date of Patent: Aug. 4, 2015

(54) NITROGEN-CONTAINING ACTIVATED CARBON MATERIAL

(71) Applicant: The Penn State Research Foundation, University Park, PA (US)

(72) Inventors: Frederick Scott Cannon, State Park, PA (US); Nicole Robitaille Brown, University Park, PA (US); Timothy M. Byrne, University Park, PA (US); Pin Hou, University Park, PA (US); Robert Parette, State College, PA (US); Xin Gu, University Park, PA (US); Colin C. Cash, University Park, PA (US); Cesar Nieto Delgado, University Park, PA (US); Siqi Hong, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 192 days.

(21) Appl. No.: 13/733,770

(22) Filed: Jan. 3, 2013

(65) Prior Publication Data
US 2013/0168321 A1 Jul. 4, 2013

Related U.S. Application Data

(60) Provisional application No. 61/582,703, filed on Jan. 3, 2012, provisional application No. 61/697,400, filed on Sep. 6, 2012.

(51) Int. Cl.
*B01J 20/28* (2006.01)
*C02F 1/28* (2006.01)
(Continued)

(52) U.S. Cl.
CPC ............ *B01J 20/28011* (2013.01); *B01J 20/20* (2013.01); *B01J 20/3204* (2013.01); *B01J 20/3248* (2013.01); *C02F 1/281* (2013.01); *C02F 1/283* (2013.01); *C02F 2101/101* (2013.01); *C02F 2101/103* (2013.01); *C02F 2101/12* (2013.01); *C02F 2101/163* (2013.01);
(Continued)

(58) Field of Classification Search
USPC .......................................... 502/417
See application file for complete search history.

(56) References Cited

U.S. PATENT DOCUMENTS

| | | | | |
|---|---|---|---|---|
| 2011/0139701 | A1* | 6/2011 | Pearks et al. ................. | 210/263 |
| 2012/0034515 | A1* | 2/2012 | Kang et al. ................... | 429/188 |
| 2014/0291587 | A1* | 10/2014 | Li et al. ......................... | 252/503 |

OTHER PUBLICATIONS

Lin Y, Cui X, Bontha J. "Electrically controlled anion exchange based on polypyrrole and carbon nanotubes nanocomposite for perchlorate removal." Environmental Science and Technology 2006;40; 4004-4009.*

*Primary Examiner* — Chester Barry
(74) *Attorney, Agent, or Firm* — Gifford, Krass, Sprinkle, Anderson & Citkowski, P.C.

(57) ABSTRACT

An activated carbon material for removing a contaminant from a liquid. The activated carbon material can be a plurality carbon grains that have a pore volume of approximately 0.1 milliliters per gram (mL/g) in the range of less than about 15 angstroms in width. The carbon grains can also have or contain a nitrogen-containing species having a concentration of more than 2 atomic percent nitrogen. A plurality of the carbon grains can be used to make a contactor that is operable to remove or reduce perchlorate having a concentration of 20 parts per billion (ppb) to less than 4 ppb from 4,500 bed volumes of water with the nitrogen-containing species leaching off of the carbon grains less than 0.1 mg/L. The activated carbon material can also be electrochemically regenerated.

22 Claims, 15 Drawing Sheets

(51) Int. Cl.
 *B01J 20/20* (2006.01)
 *B01J 20/32* (2006.01)
 *C02F 101/10* (2006.01)
 *C02F 101/12* (2006.01)
 *C02F 101/16* (2006.01)
 *C02F 101/22* (2006.01)
 *C02F 101/30* (2006.01)
 *C02F 103/06* (2006.01)

(52) U.S. Cl.
 CPC ......... *C02F 2101/22* (2013.01); *C02F 2101/30* (2013.01); *C02F 2103/06* (2013.01); *Y10T 428/2982* (2015.01)

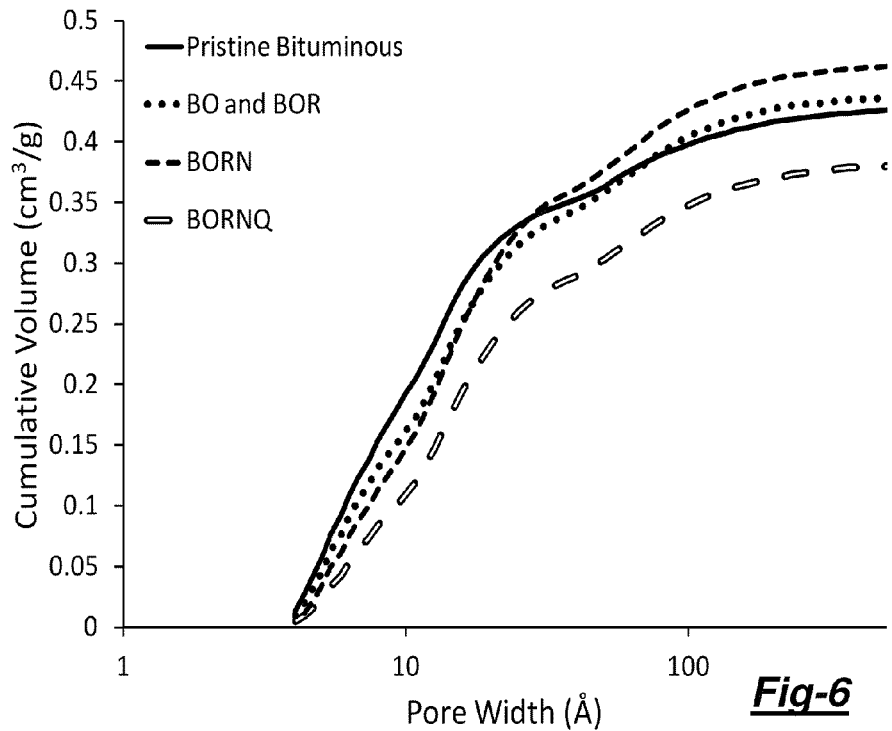
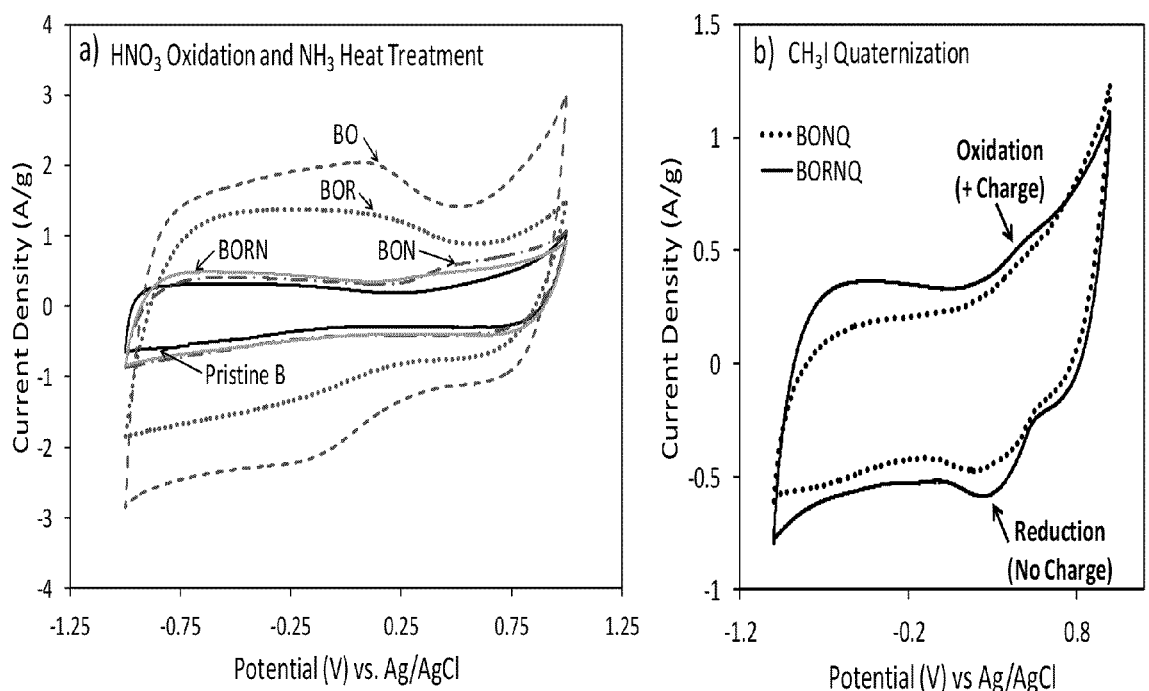
Fig-6
Fig-7

- ◆ RP2 with DI water spiked with sulfate
- ▲ RP2 with DI water spiked with sulfate and 405ppm Cl-

- ■ RP2 with groundwater spiked with 500ppm sulfate
- ● RP2 with AMD
- ◆ RP2 with groundwater spiked with 773ppm sulfate

NITROGEN-CONTAINING ACTIVATED CARBON MATERIAL

RELATED APPLICATION

This application claims priority to U.S. Provisional Patent Applications 61/582,703 filed Jan. 3, 2012 and 61/697,400 filed Sep. 6, 2012, both of which are incorporated in their entirety by reference.

GOVERNMENT INTEREST

This invention was made with government support under Contract Number 0829092 awarded by the National Science Foundation. The government has certain rights in the invention.

BACKGROUND OF THE INVENTION

Chemicals released into surface and subsurface waters can be a pervasive environmental problem. Sources of chemical contamination can range from improperly disposing of and/or treating of chemical waste, abandoned waste disposal sites, leaking storage tanks, mining and the like. Chemical contaminants can include oxyanions which can be difficult to remove from contaminated waters, soils, and the like due to the oxyanion's kinetic and thermodynamic properties. Oxyanions are defined as a chemical compound with the generic formula $A_xO_y^{z-}$ where A represents a chemical element and O represents an oxygen atom. Oxyanions of particular concern in the environment include perchlorate, sulfate, sulfite, nitrate, nitrite, arsenate, arsenite, chromate, thiosulfate, polysulfides, polythionates, hexathionate, pentathionate, tetrathionate, trithionate, dithionate, bromate, bicarbonate, carbonate, uranyl carbonate, vanadate, selenate, silicate, selenite, and/or mixtures thereof. Anions of concern could also include bromide, chloride, fluoride and sulfide.

In fact, perchlorate has become a significant environmental contaminant with conventional treatment techniques such as the use of virgin granular activated carbon, air stripping, and advanced oxidation having limited or no effect in removing low perchlorate concentrations from water. Sulfates can also be a problematic contaminant, e.g. high sulfate concentrations are known to be present in acid mine drainage water. Therefore, a material and/or process that can remove low perchlorate and/or sulfate concentrations from water would be desirable.

SUMMARY OF THE INVENTION

An activated carbon material for removing a contaminant from a liquid is provided. The activated carbon material can include grains of carbon that on average have more than approximately 0.1 milliliters per gram (mL/g) of pores that are smaller than 15 angstroms in width. The grain of carbon can also have or contain a nitrogen-containing species having a concentration of more than 2 atomic percent nitrogen. A plurality of the carbon grains can be used to make a contactor that is operable to remove or reduce perchlorate having a concentration of 20 parts per billion (ppb) to less than 4 ppb from 4,500 bed volumes of water, while the water has an alkalinity of greater than 100 milligrams per liter (mg/L) as calcium carbonate and a total organic carbon content of greater than 0.5 mg/L. Furthermore, the nitrogen-containing species does not leach off of the grain of carbon, the plurality of carbon grains and/or the contactor more than 0.1 mg/L.

In some instances, the plurality of carbon grains can be derived from lignite coal, subbituminous coal, bituminous coal, anthracite coal, coconut shells, lignin, hemicellulose, cellulose, craft black liquor, cotton, softwood, hardwood, fruit pits, graphite, exfoliated graphite, switch grass, peat, carbonaceous textiles, and/or agricultural silage. In addition, the plurality of carbon grains can be heat treated at a temperature of 250° C. or more.

The plurality of carbon grains can also contain at least 0.3 atomic percent of a halogen, the halogen being one or more of a chloride, bromide, fluoride, iodide, and/or mixtures thereof. The contactor can remove a variety of species from water, including anionic species, oxyanions, perchlorate, arsenate, arsenite, chromate, sulfate, sulfite, thiosulfate, polysulfides, sulfide, polythionates, hexathionate, pentathionate, tetrathionate, trithionate, dithionate, nitrate, bromate, bromide, chloride, bicarbonate, carbonate, uranyl carbonate, vanadate, selenate, silicate, selenite, and/or mixtures thereof. The contactor can also remove organic species such as natural organic matter, endocrine disrupting compounds, pharmaceutical and personal care products, acetate, methylene blue dye, congo red dye, geosmin, methylisoborneol, methyl tert butyl ether, chlorinated organic compounds, aliphatic organic compounds, aromatic organic compounds, ibuprofen, sulfamethoxazole, iopromide, dilantin, meprobabmat, diclofenac, naproxen, gemfibrozil, atrazine, N,N-Diethyl-meta-toluamide (DEET), acetaminophen, hodrocodone, carbamazepine, diazepam, caffeine, pentoxifyline, trimethoprim, striol, erythromycin, ethynylestradiol, testosterone, androstenedione, fluoxetine, stradiol, estrone, triclosan, tris (2-carboxeyethyl)phosphine (TCEP), progesterone, perfluorooctanoic acid, perfluorodecanoic acid, perfluorooctanesulfonic acid, and/or mixtures thereof.

The plurality of carbon grains can further contain one or more nitrogen functionalities and/or moieties such as pyridine, pyridinium, quaternary ammonium, pyrrole, amines, imines, amides, imides, pyrrolic nitrogen, pyridinic nitrogen, primary amine, carboxamide, secondary amine, tertiary amine, primary ketimine, secondary ketimine, primary aldimine, secondary aldimine, azide, azo compounds, cyanate, isocyanate, nitrate, nitrile, isonitrile, nitrosooxy, nitro, nitroso, pyridyl, viologen, aniline, poly(aniline-co-o-aminophenol), hemoglobin, porphyrin, and/or mixtures thereof.

The grain of carbon and/or the plurality of carbon grains can have a positive surface charge greater than 0.09 milliequivalents/gram at a pH of 7. In addition, the plurality of carbon grains can have an average mean grain-width dimension between 5 microns and 3 millimeters with an aspect ratio less than or equal to 10. The plurality of carbon grains can be aggregated together to form the contactor using one or more biomaterial-derived binders and the contactor can purify at least 14,000 bed volumes of water having a perchlorate concentration of at least 30 ppb, an alkalinity greater than 100 mg/L as calcium carbonate, and a total organic carbon concentration greater than 0.5 mg/L and provide water with a final perchlorate concentration of less than 4 ppb.

A plurality of inventive contained carbon grains that compress less than 20% when a water pressure of 300 kPa has been applied thereto, after the grains have been wetted and confined horizontally. In addition, the nitrogen content of the plurality of carbon grains can be achieved by exposing the carbon grains to an oxidizing agent such as nitric acid, sulfuric acid, phosphoric acid, ozone, hydrogen peroxide, oxygen, and the like followed by exposure to hot ammonia gas at a temperature above 300° C. Thereafter, the carbon grains can be exposed to an alkyl halide where the alkyl group contains 1 to 20 carbon atoms and the halide is selected from one or more of a chloride, bromide, fluoride, iodide, and/or combinations thereof. The nitrogen functionality and/or moieties can be achieved by adsorbing organic compounds onto the carbon grains, an attached functional group undergoing an epoxide reaction in high-pH conditions.

The contactor can exhibit a current change of greater than about 1 amp per gram from greatest to least when an electrical potential scan that is less than about 2.3 volts from greatest to least, as measured by a Cyclic Voltammetry protocol, is applied to the contactor. In addition, a nitrogen-functionalized organic species will not leach off of the contactor above a concentration of 0.1 micrograms per liter as monitored by a liquid chromatography triple quad mass spectroscopy.

In some instances, a contactor made from the inventive activated carbon material can purify more than 10,000 bed volumes of water having at least 20 parts per billion perchlorate down to below 6 parts per billion perchlorate.

BRIEF DESCRIPTION OF THE DRAWINGS

FIG. 6 is a graphical plot of pore width versus cumulative pore volume for bituminous GAC after different protocol steps used to produce BORNQ GAC;

FIG. 7 is a graphical plot illustrating: (a) cyclic voltammetry (CV) test results for bituminous GAC after different protocol steps used to produce BORN GAC; and (b) CV test results for BON and BORN GAC after quaternization with liquid methyl iodide ($CH_3I$);

DETAILED DESCRIPTION OF THE INVENTION

An activated carbon material for removing a contaminant from a liquid is provided. It is appreciated that the term "activated carbon" refers to a group of carbon materials having highly developed internal surface area and porosity with a large capacity for absorbing chemicals from gases or liquids.

In some instances, the activated carbon material is nitrogen-tailored having N-alkyl quaternized functionality and high mesopore volume. The nitrogen-tailoring can be provided by introducing pyridine type nitrogens onto the activated carbon surface, for example through thermal treatment in ammonia ($NH_3$). In addition, the pyridine type nitrogen can be transformed to N-alkyl pyridinium through quaternization reactions. In other instances, the nitrogen-tailoring can use pyrrolic nitrogen, e.g. pyrrole.

The inventive nitrogen-tailored activated carbon can exhibit enhanced water purification properties. Perchlorate ($ClO_4^-$) is a contaminant of concern in the U.S. because it is widespread, difficult to treat, and may be harmful at very low concentrations. Perchlorate has been detected in the ground and surface water of 26 US states, and many states have set regulatory limits, e.g. 2 µg/L in Massachusetts and 6 µg/L in California. The instant invention tailors activated carbons to remove perchlorate ($ClO_4^-$) by grafting pyridinium functionality or other nitrogen-containing functionality directly onto GAC's graphene edge sites. In this manner, very low perchlorate levels can be obtained in perchlorate contaminated water with minimum leaching of nitrogen-containing species from the GAC.

For example, a plurality of nitrogen-tailored carbon grains as disclosed herein can purify at least 4,500 bed volumes of water contaminated with at least 20 parts per billion (ppb) perchlorate down to less than 4 ppb perchlorate. In addition, the inventive material can purify at least 4,500 bed volumes of water. In some instances, the water is naturally occurring groundwater that has an alkalinity of greater than 100 milligrams per liter (mg/L) as calcium carbonate and a total organic carbon content of greater than 0.5 mg/L. Furthermore, the nitrogen-containing species that is part of the inventive material does not leach off of the material more than 0.1 mg/L.

In order to better explain and disclose the inventive material, and yet not limit the scope thereof in any way, one or more examples of producing the material and its purification properties are provided below.

EXAMPLE I

Figure 1:
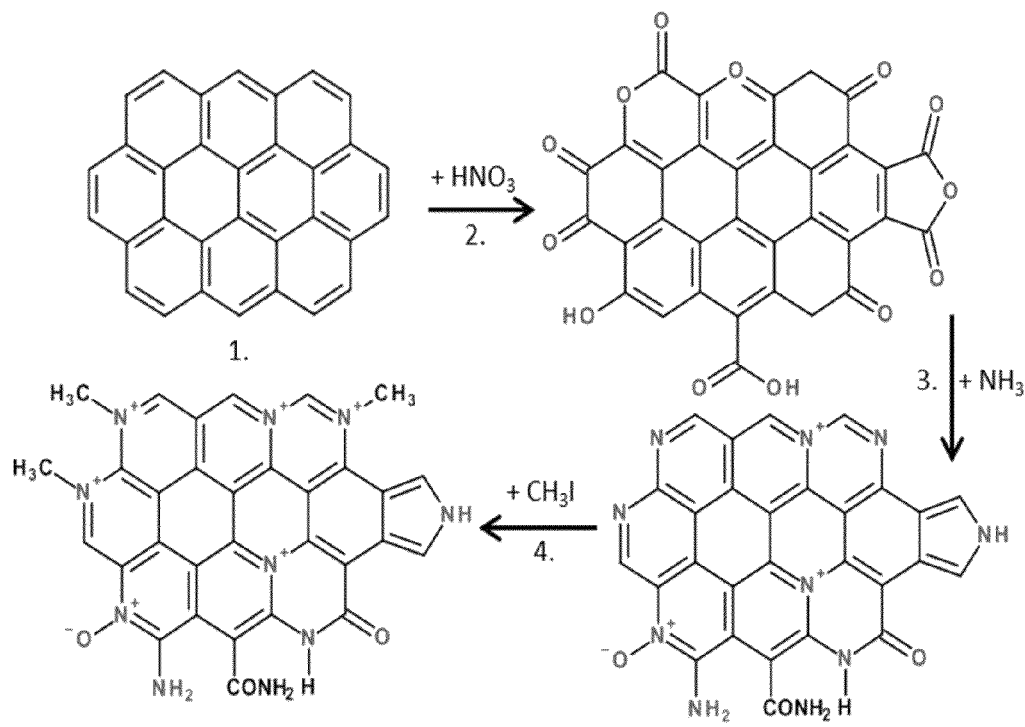
FIG. 1 is a schematic illustration of a four-step protocol for grafting a redox-active pyridinium functionality into granulated activated carbon (GAC)

Removal of Perchlorate with Redox-active Pyridinium Functionality or Other Nitrogen-containing Groups Not being bound by theory, FIG. 1 schematically illustrates a 4 step protocol for grafting a redox-active pyridinium functionality into granular activated carbon (GAC). The steps are: (1) conventional activation of the proper carbonaceous source material; (2) chemical oxidation (e.g. with $HNO_3$ as described below) so as to create oxygen functionality along graphene edge sites; (3) thermal ammonia ($NH_3$) treatment so as to displace oxygen (O) with nitrogen (N) and form pyridine and other N functionalities; and (4) chemical quaternization with an alkyl halide (e.g. $CH_3I$ as described below) so as to form pyridinium and other redox-active N functionalities.

Conventional activated carbons host polyaromatic graphene layers that offer reactive edge sites, and chemical oxidation with either nitric acid, hydrogen peroxide, or other oxidants can increase the materials oxygenated functionality. In addition, when activated carbon is thermally treated in ammonia, the treatment can incorporate N into basic surface functional groups.

Preceding a thermal ammonia treatment with chemical oxidation can greatly increase N incorporation and the temperature for the ammonia (or other N-containing gas) treatment can influence the nature of the incorporated N. For example, at temperatures less than 600° C., carboxyl, hydroxyl, lactone, and carbonyl decomposition leads to incorporation of predominantly aliphatic N (imide, amine, nitrile) functional groups, whereas at temperatures greater than 600° C. ether-like functionalities decompose, allowing reactive N species to create predominately aromatic N (pyrrole and pyridine).

In some instances, the inventive material disclosed herein requires nitrogen to specifically appear as an edge-site pyridinium, and not merely as recessed quaternary ammonium, for effective perchlorate sorption. Once pyridine groups are introduced into the carbon structure, the Menschutkin reaction can be used to quaternerize the pyridine groups into pyridinium groups by reaction with an alkyl halide.

In some instances, the inventive material was obtained by: (1) grafting pyridinium functionality into the surface of several different commercial GACs to enhance perchlorate removal, via a four step procedure; (2) characterizing the four step procedure using pore volume analysis, XPS, surface charge titration, dye adsorption, and perchlorate removal experiments; and (3) testing the conductivity and redox-state control of pyridinium-grafted GAC. In addition: (1) pyridinium and/or pyrrole functional groups were introduced into GACs derived from several different parent materials and improved the perchlorate and sulfate removal capacity by increasing positive surface charge; and (2) the redox state of the pyridinium and/or pyrrole functional groups introduced into the basal planes of GAC were chemically or electrochemically controlled so as to switch back and forth from positive to neutral charge.

Four main N groups have been assigned or determined by peak an N1s x-ray photoelectron spectroscopy (XPS) signal obtained from samples: pyridinic-N(N6); pyrrolic-N (N5); quaternary N(NQ); and oxidized N(NX). The N6 groups include those that contribute one p electron to the π-system, whereas N5 groups contribute two p electrons. NQ groups can be pyridinium groups. NQ groups can also be N groups substituted for C atoms in an aromatic ring, in which there are three σ-bonds and 2 p electrons to the π-system or pyridinium group. NX groups have high binding energies and correspond to nitro, nitroso, and pyridine-N-oxide.

Materials

Regarding materials used to develop and/or test the N-tailored GACs, groundwater taken directly from the Pennsylvania State University Well 17 served as the primary water source. The Well 17 water was spiked with 30 ppb $ClO_4^-$, and then was used for $ClO_4^-$ removal experiments. The groundwater also contained 54.5 mg/L chloride, 180 mg/L hardness (as $CaCO_3$), 7.2 mg/L sulfate, 4.2 mg/L nitrate (as $NO_3^-$), 0.77 mg/L TOC; and it had a pH of 7.5. Deionized (DI) water that was obtained or treated by a Millipore Milli-Q Academic system, with resistance maintained above 18.1 Ω-m/cm², was used for preparing stock solutions and standards. For example, standard and stock $ClO_4^-$ solutions were prepared by dissolving ACS grade solid anhydrous sodium perchlorate (EM Science) in DI water.

Other chemicals used were ACS grade 99.5% iodomethane stabilized with copper (Alfa Aesar), concentrated nitric acid (J. T. Baker), anhydrous sodium hydroxide pellets (Fisher), and sodium borohydride (Sigma Aldrich). GTS Welco (Allentown, Pa.) supplied gases used—99.99% anhydrous ammonia, 99.999% nitrogen, 99.999% argon, and 99.999% helium.

Four "pristine" or "virgin" GAC sources were appraised: bituminous-based Ultracarbon 1240C (UC 1240), manufactured by Siemens Water Technologies; coconut-based Aquacarb 1240C (AC 1240C), manufactured by Siemens Water Technologies; chemically-activated hardwood Nuchar RGC40 manufactured by MeadWestvaco; and wood-based phosphoric acid activated (at 550° C.) Gran C manufactured by NORIT Americas Inc. All of these pristine activated carbons had experienced thermal treatments that considerably exceeded 250° C., and also exceeded 400° C. The activated carbons had an average mean grain-width dimension that was between 5 microns and 3 millimeters, with a length-to-width aspect ratio considerably less than or equal to 10, and also less than or equal to 2. When the carbon grains had been wetted and confined horizontally, they compressed less than 20% when a water pressure of about 300 kPa was applied thereto. Also, these carbon grains had not been made by depositing a solid from an organic gas.

EXAMPLE 1a

Preparation of N-tailored GACs

Four basic steps were performed to prepare or produce the N-tailored GACs, and especially the GACs that pere prepared to include pyridinium functinnality. First, one of the four pristine GACs was selected as a starting material and processed to a US Mesh #200×#400 size distribution (37-74 μm) in order to be the appropriate size for proportional diffusivity similitude in Rapid Small-Scale Column Tests (RSSCTs) that were conducted in accordance with the Standardized Proportional Mini-Column Adsorber protocol.

Second, 10 grams of the processed GAC was oxidized with 100 mL of 7.9 M Nitric Acid ($HNO_3$). The reaction solution was stirred for 6 hours at a set temperature (20, 50, 80, 95 or 105° C.), using a condensing column to allow reflux. The residual acid was removed by filtration and the treated GAC was washed in distilled water until a constant pH was obtained. For many cases presented herein, the chemical oxidation was followed by treatment with sodium borohydride ($NaBH_4$) so as to alter the type of oxygen functionality to more reduced states. For these cases, six grams of GAC was mixed with 180 mL $NaBH_4$ (1.5 M $NaBH_4$ in 4.7 M NaOH), and this solution was stirred for 24 hours at room temperature. After reaction the GAC was washed with DI water and dilute hydrochloric acid until the water hosted neutral pH. Then the GAC was dried at 50° C.

Third, thermal ammonia treatment of the oxidized GAC was carried out using a cylindrical glass fluidized bed reactor in a 3210 furnace/oven (Applied Test Systems, Inc). When specifically listed, ammonia treatment was also carried out in a thermogravimetric analyzer. The temperature was ramped at 5° C./min from ambient to 700° C. in a pure ammonia gas flow at 25 mL/min-g GAC. The sample was held at 700° C. for 30 minutes and then quickly cooled in a nitrogen gas ($N_2$) atmosphere to ambient temperature. Samples were then washed with distilled water until a constant pH was obtained, dried in an oven at 90° C., and stored in a vacuum desiccator until ready for use/testing.

Fourth, quaternization was accomplished by reacting the ammonia-treated GAC with 15 mL liquid methyl iodide ($CH_3I$) at room temperature for 5 days with stiffing in a vial covered in foil. Then the samples were allowed to dry overnight in a vacuum oven at 60° C. followed by washing in a column with 2M NaCl flow for 6 hours and rinsing with DI for 24 hours so as to load the N-tailored GAC with $Cl^-$ counter ions.

The GACs produced during the different treatment steps were labeled and defined as shown in Table 1 below with the more favorable temperature for oxygen treatment for each of the pristine GACs also specified in the table. Regarding the definition/labeling of the GACs, one example follows: BONQ—B signifies pristine bituminous GAC, BO signifies oxidized bituminous GAC, BON signifies oxidized bituminous GAC after thermal ammonia treatment, BONQ signifies BON following methyl iodide quaternization. In addition to the above, R signifies reduction in sodium borohydride ($NaBH_4$) and C as a suffix signifies thermal treatment in the control gas $N_2$.

EXAMPLE 1b

Characterizations and Experiments

Unless otherwise specifically noted, the following characterization and experimental protocols were used throughout this patent application.

Unless otherwise specifically noted, Surface charge distribution was conducted by the Surface Charge Titration protocol reported by Chen et al. [1, 2] using a Mettler Toledo DL53 titrator (Columbus, Ohio). The total net surface charge distribution, pH of Point of Zero Charge

TABLE 1

Sample naming protocol where each position represents a different step

| Full Label | 1st Position<br>Pristine GAC | 2nd Position<br>(O or OR*)<br>Oxidation<br>Temperature** (° C.) | 3rd Position<br>(N or C)<br>Heat Treatment | 4th Position<br>(Q)<br>Quaternization |
|---|---|---|---|---|
| BOCQ | B = Bituminous<br>(Siemens UC1240) | 80 | C: $N_2$ gas treated at 700° C. with 30 min dwell time and 25 mL/min/g flow (control) | Quaternerized with $CH_3I$ for 5 days at room temperature |
| BONQ | | | N: Ammonia treated at 700° C. with a 30 min dwell time and 25 mL/min*g pure $NH_3$ flow | |
| BORNQ | | 80* | | |
| CONQ | C = Coconut<br>(Siemens AC1240C) | 95 | | |
| HONQ | H = Hardwood<br>(MWV Aquanuchar RGC40) | 20 | | |
| WNQ | W = Wood<br>(Norit Gran C) | No Oxidation | | |

*OR = The protocol of 'O' followed by reduction with 1.5M $NaBH_4$ for 24 h at room temperature
**Oxidized at more favorable temperature (80, 95, or 20° C.) for GAC type in 7.9M $HNO_3$ for 6 hours.

by Titration ($pH_{PZCT}$), and pKa of surface functional groups were measured. Titrations started at low pH and then NaOH was incrementally added. Two NaCl solutions (0.01 and 0.1N) were used as electrolytes in the titration. Then where the plots from these two NaCl solutions crossed was normalized to zero-charge.

Unless otherwise specifically noted, the X-ray Photoelectron Spectroscopy protocol (XPS) employed a Kratos Analytical Axis Ultra XPS machine with Casa XPS software used for peak fitting of N 1s (398.3-405.8±0.2 eV), C 1s (284.8-288.9±0.2 eV) and O 1s (531.1-536 eV) signals. XPS was also used to characterize the nature of the nitrogen functionality, such as pyridinic-N(N6), pyrrolic-N(N5), quaternary N(NQ), and oxidized N(NX). In some cases, the S2p peak was used to characterize sulfur, for adsorbed sulfate quantification.

Unless otherwise specifically noted, the Argon Adsorption Density Functional Theory (DFT) protocol was used for pore structure analysis of the GACs. This protocol presumes slit pores, while using gaseous argon adsorption isotherm data from Micromeritics Accelerated 2010 Surface Area and Porosimetry analyzers (ASAP), per the protocol of Moore et al. [3]. Multiple incremental steps of argon adsorption were carried out in a liquid argon bath (87.3 K). Before analysis, activated carbon samples were first degassed at 105° C. to ≤0.010 Torr. Helium gas adsorption was analyzed by DFT to obtain the free space analysis data, which was then used in determination of the pore volume distribution and BET surface area measurements.

Unless otherwise specifically noted, the Cyclic Voltammetry (CV) protocol, included scans that were performed using a 3 mm carbon paste working electrode (BASi, West Lafayette, Ind.), Ag/AgCl reference electrode (BASi), and coiled platinum counter electrode with a Biologic (Claix, France) VMP3 potentiostat and EC Lab V10.02 software. GAC samples were loaded on the carbon paste working electrode after freshly preparing and polishing. Before cyclic voltammetry, a 20 mL electrode cell was filled with 10 mL of electrolyte, and this electrolyte was bubbled for 20 minutes with $N_2$ gas before analysis and blanketed with $N_2$ gas during analysis. For aerobic experiments, the electrolyte was bubbled with air instead of $N_2$ gas. The GAC loaded carbon paste working electrode was allowed to "wet" (i.e. it was immersed in water) during the degassing time. Cyclic voltammetry was performed at a scan rate of 10 mV/s unless otherwise stated.

EXAMPLE 1c

Oxyanion Removal Experiments

Unless otherwise specifically noted, the Standardized Proportional Mini-Column Adsorber protocol employed Rapid Small-Scale Column Tests (RSSCTs). When characterizing perchlorate removal, this protocol used plastic columns with a 0.8 mL bed volume (BV). It was assumed that proportional diffusivity applied to the RSSCTs, while simulating a full-scale empty bed contact time (EBCT) of 20 minutes. For this simulation, the RSSCTs employed an EBCT of 1.05 minutes at a flowrate of 0.76 mL/min, using a Waters 510 HPLC pump. Columns were allowed to sit overnight in test water before a RSSCT was started, so as to allow liquid to fill the GAC pores.

Perchlorate concentrations were measured using a Dionex DX 500 Ion Chromotography unit. The DX 500 was equipped with a 4-mm AS16 column, a 4-mm AG16 guard column, a 4-mm ASRS 300 ultra suppressor, and a DS3 detection stabilizer. An eluent concentration of 25 mM NaOH was used with a 1000 μL loop and method detection limit (MDL) of 2 ppb.

Adsorption of perchlorate on a GAC electrode was conducted by first binding GAC to a circular piece of carbon conductive tape (5 mm diameter) which was bound to the carbon paste electrode. An appropriate electrode (10 mL) was added to the electrochemical cell and degassed for 20 minutes with $N_2$ gas. Anodic treatment (oxidation) was performed in the chronoamperometry mode with a set positive voltage (vs. reference electrode) for a defined oxidation time. If the same sample was reduced, the electrode was washed with DI and then placed in a new degassed electrolyte. Cathodic treatment (reduction) was also performed in the chronoamperometry mode with a predetermined negative potential (vs. reference electrode) for a defined reduction time. The current-time profile was recorded to assess the progress of the reaction. After the electrochemical treatment was completed, the carbon tape loaded with GAC was washed with DI and allowed to dry in a vacuum oven at 60° C. After drying, the tape was removed and stored in a desiccator until XPS analysis. XPS analysis was performed to collect the survey of C1s, N1s, O1s, and C12p and/or S2p signals.

Unless otherwise specifically noted, the Adapted Batch Adsorption Isotherm protocol was conducted using a bottle-point method. The isotherms used only 0.02 g of GAC for each isotherm point, so as to use these carbons sparingly. Specifically, 0.02 g of GAC was mixed with 23 mL of DI water that had been spiked with oxyanion levels that ranged from 100 ppb to 1000 ppm. When monitoring perchlorate, these could employ starting perchlorate concentrations of 102.3 ppb, 350 ppb, 1.2 ppm, 4 ppm, 13.5 ppm, 50 ppm and 100 ppm. These were mixed in sealed glass vials by shaking them on a rotary shaker for 24 h at room temperature. After that, the carbon particles were removed on a 0.45 μm nylon fiber filter (VWR), and the separated solution was analyzed for perchlorate concentration.

Unless otherwise specifically noted, the leaching of quaternary ammonium off of the nitrogen-containing activated carbons was screened by the Tsubouchi Two-Phase Titration dye protocol as adapted by Parette et al.[4] from Tsubouchi [5], Utilizing this method, a quaternary ammonium compound was titrated by tetraphenol borate. When the titration was complete, the indicator dye (tetrabromophenolphthalein ethyl ester potassium salt) incurred a color change from blue to yellow in the organic phase (1,2-dichloroethane). This method was able to detect alkylated quaternary ammonium at concentrations down to about 0.1 mg/L. If the quaternary ammonium was below detectable limits, the organic phase was a yellow color even at the start.

EXAMPLE 1d

Regeneration Processes

A bulk electrochemical reaction cell contained a #100 US mesh platinum gauze counter electrode (Sigma Aldrich), Ag/AgCl reference electrode (BASi), graphite (McMaster-Carr) and a packed GAC bed working electrode. The cell had dimensions of roughly 5 cm×5 cm×7 cm. After full perchlorate breakthrough during RSSCT, spent GAC was removed from the small scale column and dried at 60° C. in a vacuum oven. The dried GAC was spread onto a US #400 mesh size polyester screen (Ted Pella, Inc.) which had been attached to a rubber gasket. A polished graphite working electrode was tightened against the GAC to create a packed bed electrode. Next, 17 mL of electrolyte was added to the cell, and the solution was then stirred for 2 hours to allow electrolyte "wetting." The electrolyte was then degassed for 20 minutes with $N_2$ gas, and a cathodic current (reduction) was applied for a predetermined time in the chronoamperometry mode. After reduction, the GAC sample was washed with DI water and allowed to dry in a vacuum oven. The GAC was then loaded into a column to rinse the remaining desorbed perchlorate ions from the pores with DI water and 0.005-0.02M NaCl (as indicated). Samples were taken throughout the regeneration process to monitor the concentration of desorbed ion in solution. After perchlorate no longer was appreciably diffusing from the pores, the GAC was reactivated. For reactivation, the GAC was loaded back into the bulk electrochemical cell and oxidized at 0.9 V for 20 minutes in degassed 0.02 M NaCl. The regenerated GAC was then analyzed by RSSCT as described above.

Alternatively, some spent media was reduction-regenerated with sodium borohydride. After full breakthrough in RSSCT with perchlorate-spiked groundwater, the spent media was regenerated by reduction with a 500 mg/L $NaBH_4$ solution (prepared from stock 4.4M $NaBH_4$/14M NaOH solution). One hundred BVs of this solution were processed through the spent media at 0.8 mL/min with a Waters 510 HPLC pump. The column was then washed with 2 liters of DI water, at which point the oxidation reduction potential (ORP) level of effluent water was equal to that of DI water. The $ClO_4^-$ concentration was monitored by $ClO_4^-$ ion selective electrode (Thermofisher Scientific), and the redox level was monitored by an ORP probe (Thermofisher Scientific). The ion selective electrode was calibrated with perchlorate standard solutions prepared in a 500 mg/L $NaBH_4$ background. After regeneration, the perchlorate removal was directly assessed by a subsequent RSSCT per the same protocol as described above.

EXAMPLE 2

Quaternized Functional Groups for Perchlorate Removal

Figure 2A:
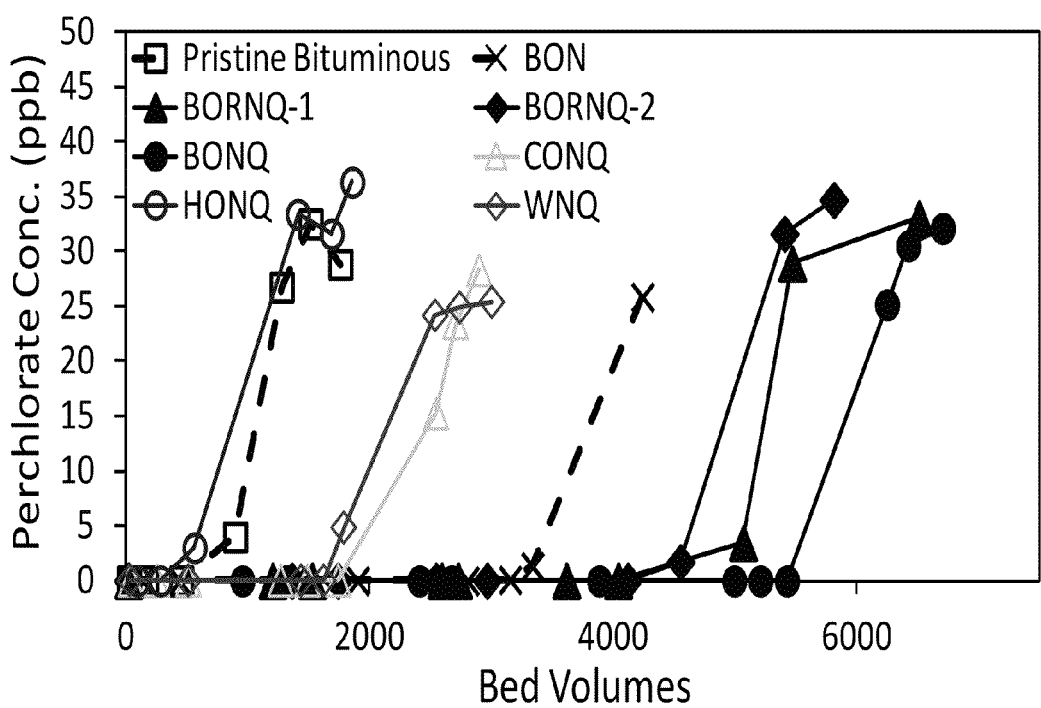
FIG. 2a is a graphical plot illustrating Rapid Small-Scale Column Tests (RSSCTs) of perchlorate breakthrough by pristine GAC and various N-tailored GACs listed in Table 1.

The introduction of quaternized functional groups into GAC significantly increased its $ClO_4^-$ removal capacity, as manifest by RSSCTs that employed the Well 17 groundwater that had been spiked with 30 ppb $ClO_4^-$. These RSSCTs employed the Standardized Proportional Mini-Column Adsorber protocol for perchlorate. In one of the more favorable protocols, the bituminous GAC had undergone the multi-step protocol of $HNO_3$ oxidation, thermal ammonia treatment, and $CH_3I$ quaternization (BONQ). In RSSCTs, this quaternized bituminous carbon processed 5,800 BVs before reaching 6 ppb $ClO_4^-$—(the California MCL) breakthrough (FIG. 2a); and they reached 5,600 BV before reaching 4 ppb perchlorate. On several occasions, the effluents from the BONQ and BORNQ were monitored for the presence of alkyl quaternary ammonium leaching by the Tsubouchi Two-Phase Titration dye protocol; and the results indicated that there was no alkyl quaternary ammonium that had leached, above the detection threshold of 0.1 to 0.2 mg/L. These were specifically monitored at about 20, 1400, and 2600 BV. The above perchlorate removal performance exceeded the 900 BVs for pristine bituminous GAC and the 3500 BVs for bituminous GAC that had been oxidized and ammonia-treated (BON). When the $HNO_3$-oxidized bituminous GAC (BO) was reduced in $NaBH_4$ before thermal $NH_3$ treatment and then quaternerized (BORNQ), this GAC achieved 4600-5000 BV to 4 ppb $ClO_4^-$ breakthrough for duplicates. When the other pristine GAC sources experienced the multi-step quaternization, they offered less $ClO_4^-$ removal per the same GAC volume: 2100 BVs to 4 ppb $ClO_4^-$ breakthrough for coconut-based (CONQ), 1800 BVs for wood-based (WNQ), and 500 BV for hardwood-based (HONQ). These results show that the tailoring procedure greatly increased the perchlorate removal ability while also chemically bonding the positively-charged nitrogen adsorption sites into the GAC graphene planes, as confirmed by XPS analysis.

Figure 2B:
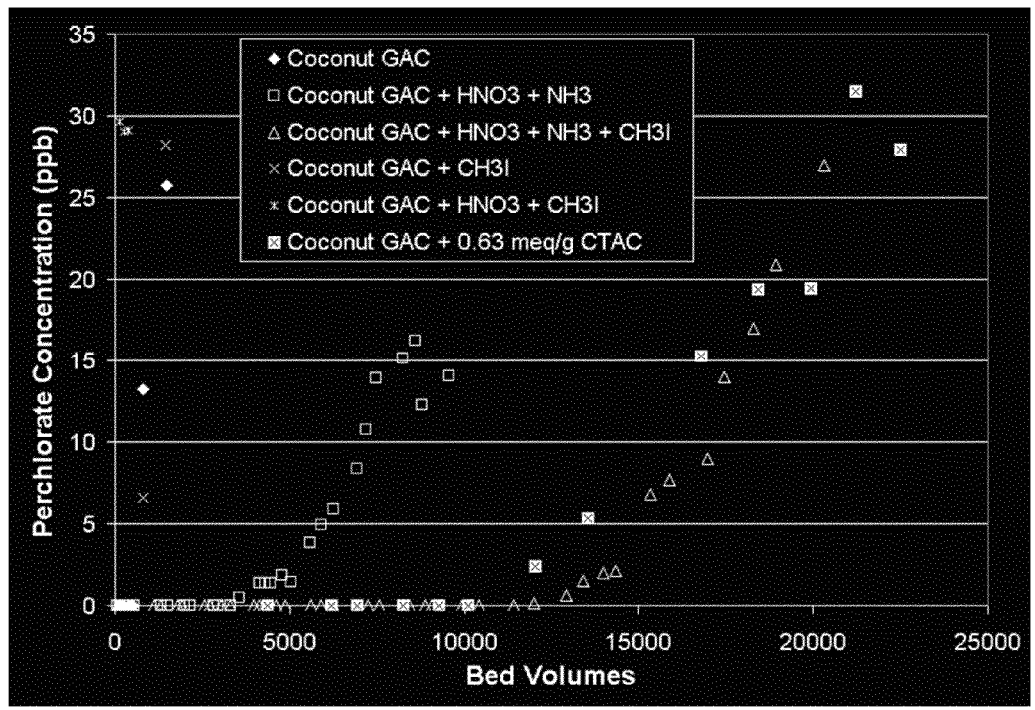
FIG. 2b is a graphical plot illustrating Rapid Small-Scale Column Tests (RSSCTs) of perchlorate breakthrough by coconut GAC and various N-tailored GACs, while processing native Redlands, Calif. groundwater that contains 30 ppb perchlorate.

By bonding methylpyridinium functionality into coconut GAC, a product was generated that for 14,000 BV removed perchlorate to below 4 ppb from a native Redlands, Calif. groundwater (FIG. 2b) that contained 30 ppb perchlorate. To produce this media, the coconut-based GAC was treated in 8 M nitric acid ($HNO_3$) for 20 hours so as to introduce a large number of oxygenated groups onto the carbon surface. The nitric acid treated carbon was then rinsed in distilled water, dried it at 105° C., and then thermally treated it in ammonia gas ($NH_3$) so as to incorporate nitrogen into the structure. The temperature during $NH_3$ treatment increased to 700° C.; and this induced nitrogen to form pyridine groups. Finally, the ammonia-treated carbon received iodomethane ($CH_3I$) treatment at room temperature for a period of 5 days to convert pyridine groups to charged alkyl pyridinium groups. This product was overnight in air at room temperature, then dried under vacuum at 60° C. for two hours, then washed it with 120 bed volumes of 1M sodium chloride followed by 1500 bed volumes of distilled water. The washing procedure exchanged most of the iodide ions with chloride ions. Redlands water then passed through RSSCTs of these carbons while employing proportional diffusivity; and BV to breakthrough appear in FIG. 2b.

As stated above, with this full series of treatments, the product processed 14,000 at 4 ppb perchlorate breakthrough. No alkyl quaternary ammonium leached through the bed, as determined by the Tsubouchi Two-Phase Titration dye protocol. In comparison, 4 ppb perchlorate breakthrough occurred at 4,000 BV with the ammonia treated carbon, and at less than 1,000 bed volumes for the virgin coconut carbon. As controls, the virgin coconut and the nitric acid treated GAC also received iodomethane treatment. The coconut GAC treated merely with iodomethane performed just like the virgin carbon; while the nitric acid GAC treated with iodomethane exhibited immediate perchlorate breakthrough. The full treatment product exhibited 0.43-0.63 meq/g of positive sites, as per XPS, ion chromatography, and mass-gain measurements.

In order to further elucidate the mechanisms of enhanced $ClO_4^-$ removal, the impact of each tailoring step on the properties of the bituminous GAC was appraised by analyzing with XPS, surface charge titration, and pore volume analysis (Table 2). Oxidation with nitric acid significantly increased the surface oxygen content to 13.4% (BO), while subsequent $NaBH_4$ reduction decreased the surface oxygen content of this to 10.4% (BOR). Treatment with nitric acid also introduced 1.2% N, but this N was completely in the oxidized form (i.e. nitro, nitroso). The surface oxygen was subsequently decreased to 3.4% after thermal treatment with ammonia (BORN), and then remained at about this level (3.1%) after quaternization with $CH_3I$ (BORNQ).

Also, $NH_3$ treatment produced a total loading of 4.9% N for BORN and 3.9% for BON by reaction of $NH_3$ with reactive sites created when oxygen groups decomposed to CO and $CO_2$ gases during pyrolysis. The N content remained at about this level after quaternization (5.1% for BORNQ and 3.3% for BONQ). The decrease in % O correlated with the increase in % N when analyzing $NH_3$-treated samples. These results confirmed the proposed mechanism, which asserts that N groups replace or react with surface O groups during thermal $NH_3$ treatment. Parenthetically, when thermal treatment was conducted with the control $N_2$ gas (BOC and BOCQ) the % N content increased far less: to 0.7% for BOC and 0.8% for BOCQ.

Though BONQ and BORNQ performed nearly equally during $ClO_4^-$ RSSCTs, BORNQ showed more pronounced redox behavior during other analyses, so it was expected to achieve more favorable electrochemical regeneration. As such, more focus and analysis of the BORNQ was conducted with surface charge titration and XPS peak fitting. The trends observed were taken as being representative of trends that would also be observed for both BON and BONQ.

TABLE 2

Properties of bituminous GAC during each tailoring step. C, N, O elemental compositions are in At. % by XPS analysis

| | GAC Sample | | | | | | | | |
|---|---|---|---|---|---|---|---|---|---|
| | Pristine B | BO | BOR | BORN | BORNQ | BON | BONQ | BOC | BOCQ |
| Micropore Volume (cm$^3$/g) | 0.313 | 0.290 | 0.290 | 0.296 | 0.233 | 0.307 | 0.286 | 0.319 | 0.287 |
| Mesopore Volume (cm$^3$/g) | 0.113 | 0.146 | 0.146 | 0.167 | 0.146 | 0.158 | 0.127 | 0.136 | 0.135 |
| BET Surface Area (m$^2$/g) | 852 | 831 | 829 | 888 | 693 | 888 | 748 | 902 | 822 |
| C (%)[1] | 93.3 | 85.2 | 88.5 | 90.7 | 91.9 | 92.1 | 92.6 | 88.3 | 92.0 |
| O (%)[1] | 6.4 | 13.4 | 10.6 | 3.4 | 3.1 | 4.0 | 3.2 | 10.9 | 6.7 |
| N (%)[1] | 0.4 | 1.4 | 1.6 | 4.9 | 5.1 | 3.9 | 3.3 | 0.7 | 0.8 |
| N6 fraction[2] | 0.14 | 0.05 | 0.00 | 0.41 | 0.35 | 0.41 | 0.34 | 0.21 | 0.16 |
| N5 fraction[2] | 0.04 | 0.05 | 0.89 | 0.26 | 0.26 | 0.21 | 0.26 | 0.23 | 0.21 |
| NQ fraction[2] | 0.73 | 0.19 | 0.00 | 0.18 | 0.23 | 0.19 | 0.24 | 0.30 | 0.41 |
| NX fraction[2] | 0.08 | 0.71 | 0.11 | 0.16 | 0.17 | 0.18 | 0.16 | 0.25 | 0.21 |
| Total Surface[3] Groups (mmol/g) | 0.32 | 2.616 | 1.97 | 0.99 | 1.23 | — | — | — | — |
| pH$_{PZCT}$ | 5.9 | 2.7 | 6.5 | 8.3 | 10.4 | — | — | — | — |

[1]Atomic percentage as determined by XPS analysis and peak fitting.
[2]Fraction of N that is of the following species types: N6 = pyridine-like; N5 = pyrrole-like, including amines,; NQ = quaternary-N,; and NX = nitrogen oxide groups; discerned by XPS peak fitting.
[3]By surface group titration.

Figure 3:
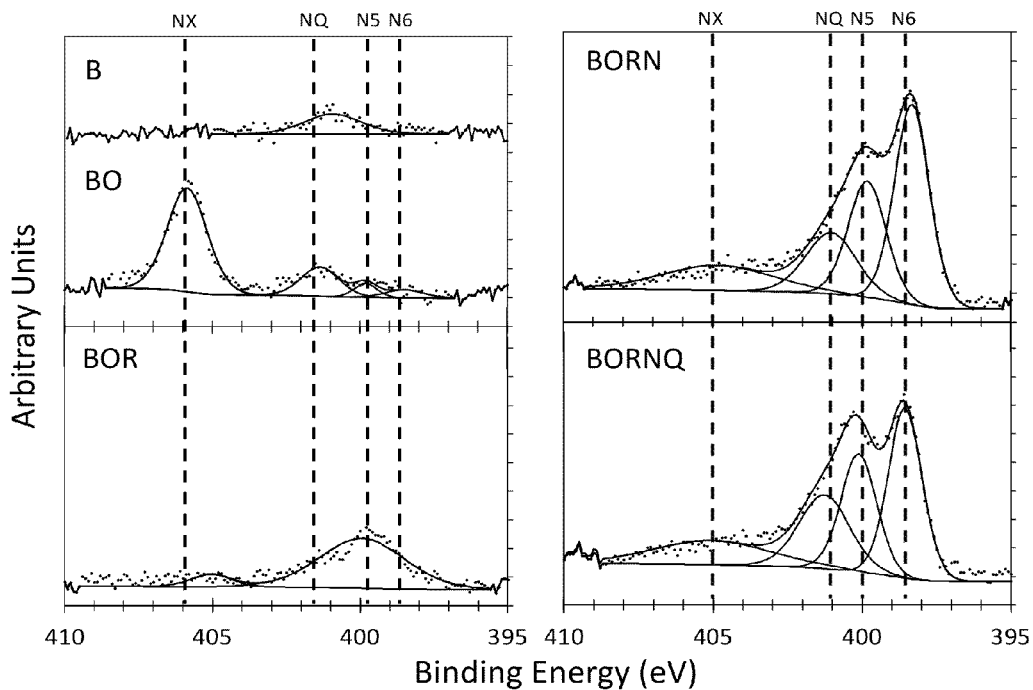
FIG. 3 is a graphical plot illustrating x-ray photoelectron spectroscopy (XPS) results for pristine bituminous GAC and various N-tailored GACs.
Figure 4:
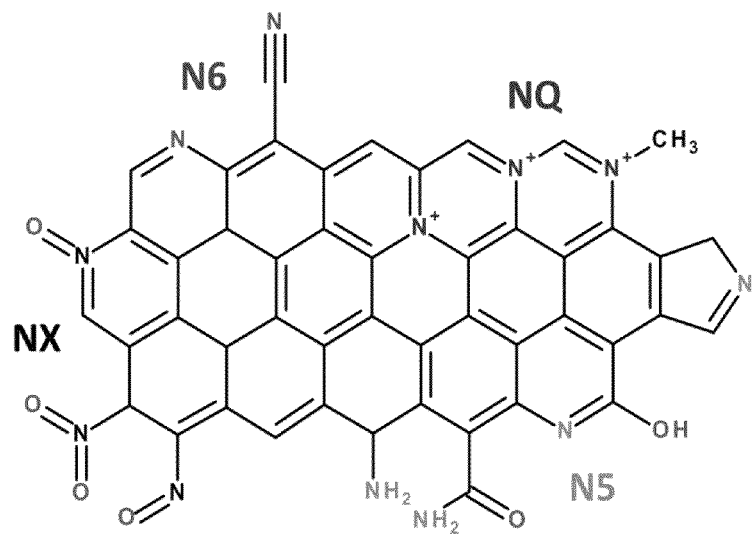
FIG. 4 is a chemical model illustrating pyridinium at edge-sites or quaternary N which is recessed within a graphene plane of GAC.

By peak fitting the N1s peak after each step for quaternization of the bituminous GACs, the development of the types of nitrogen throughout the tailoring procedure was explored. During nitric acid treatment, some nitrogen was introduced; but these were primarily nitro, nitroso or n-oxide (NX) groups. After reduction with NaBH$_4$ (BOR), a considerable portion of these N groups were reduced to an amine/amide form (N5 peak) (FIG. 3). During thermal ammonia treatment, N functional groups of several varieties were introduced, although the largest N fraction (0.41) were pyridinic-like (N6). Finally, quaternization with methyl iodide decreased the fraction of pyridinic-like (N6) groups (amongst all N-groups) from 0.41 to 0.35 for BORNQ and from 0.41 to 0.34 for BONQ and increased the fraction of quaternary-like (NQ) groups (amongst all N-groups) from 0.18 to 0.23 for BORNQ and from 0.19 to 0.24 for BONQ (Table 2). The NQ component represents quaternary ammonium, which technically could appear as pyridinium at edge-sites or quaternary N which is recessed within a graphene plane of GAC (see FIG. 4). Following the CH$_3$I alkylation step, the pyridinium at edge-sites is perceived as the more likely outcome than the recessed quaternary N. Thus, based on the semi-quantitative XPS peak fitting of the N is envelope, quaternization converted pyridine (N6) groups to pyridinium groups (NQ).

As discerned by the Surface Charge Titration protocol, the significant increase in pH$_{PZCT}$ (Table 2) between BORN and BORNQ provides further evidence for the conversion to pyridinium, as it is the pyridinium that exhibits a much higher charge density than does the pyridine group from which it originates. A more detailed analysis of the surface charge evolution through the quaternization steps is discussed below.

Though the perchlorate removal ability of the tailored GACs varied widely between the parent sources, the surface chemistry developed during the quaternization tailoring steps developed with similar trends (Table 3). Significant increases in 0 content were achieved with HNO$_3$ treatment, and the O percent was subsequently decreased during thermal ammonia treatment Likewise, surface N content increased marginally during HNO$_3$ treatment for all samples due to introduction of N-oxides. During thermal ammonia treatment, significant increases in nitrogen were observed for all parent GACs, although to varying degrees. In addition, all quaternized GACs showed conversion of pyridine-like N(N6) to quaternary N (NQ). As such, the quaternization reaction was confirmed in GACs of varying source materials, porosities, and chemical compositions.

TABLE 3

Surface properties of the other GACs during each of the quaternization steps with 30 minute NH$_3$ treatment at 700° C.

| Sample | C (%)[1] | O (%)[1] | N (%)[1] | N6[2] | N5[2] | NQ[2] | NX[2] | BET Surface Area (m$^2$/g) | Micropore Volume (cm$^3$/g) | Mesopore Volume (cm$^3$/g) |
|---|---|---|---|---|---|---|---|---|---|---|
| Pristine Coconut | 93.64 | 6.36 | N.D. | — | — | — | — | 1009 | 0.399 | 0.022 |
| CO | 82.27 | 16.75 | 0.98 | 0.1 | 0.12 | 0.11 | 0.67 | 962 | 0.377 | 0.021 |
| CON | 91.96 | 2.89 | 5.95 | 0.42 | 0.21 | 0.23 | 0.14 | 1067 | 0.363 | 0.116 |
| CONQ | 89.87 | 3.37 | 5.37 | 0.34 | 0.21 | 0.32 | 0.14 | 954 | 0.217 | 0.073 |
| Pristine Hardwood | 95.78 | 4.22 | N.D. | | | | | 1483 | 0.371 | 0.679 |
| HO | 89.82 | 8.94 | 1.25 | 0.07 | 0.07 | 0 | 0.87 | 1383 | 0.353 | 0.607 |
| HON | 94.86 | 2.14 | 3.00 | 0.39 | 0.14 | 0.3 | 0.16 | 1381 | 0.364 | 0.694 |

TABLE 3-continued

Surface properties of the other GACs during each of the quaternization steps with 30 minute $NH_3$ treatment at 700° C.

| Sample | C (%)[1] | O (%)[1] | N (%)[1] | N6[2] | N5[2] | NQ[2] | NX[2] | BET Surface Area ($m^2/g$) | Micropore Volume ($cm^3/g$) | Mesopore Volume ($cm^3/g$) |
|---|---|---|---|---|---|---|---|---|---|---|
| HONQ | 94.18 | 2.02 | 3.20 | 0.24 | 0.23 | 0.35 | 0.18 | 1323 | 0.324 | 0.612 |
| Prisitne Wood | 85.95 | 12.30 | 0.81 | 0.13 | 0.25 | 0.37 | 0.25 | 1211 | 0.348 | 0.651 |
| WN | 89.80 | 3.50 | 6.70 | 0.32 | 0.24 | 0.32 | 0.12 | 934 | 0.273 | 0.479 |
| WNQ | — | — | — | — | — | — | — | 791 | 0.148 | 0.349 |

[1]Atomic percentage as determined by XPS analysis and peak fitting.
[2]Fraction of N that is of the following species types: N6 = pyridine-like,; N5 = pyrrole-like, including amines; NQ = quaternary-N,; and NX = nitrogen oxide groups; discerned by XPS peak fitting.

Figure 5:
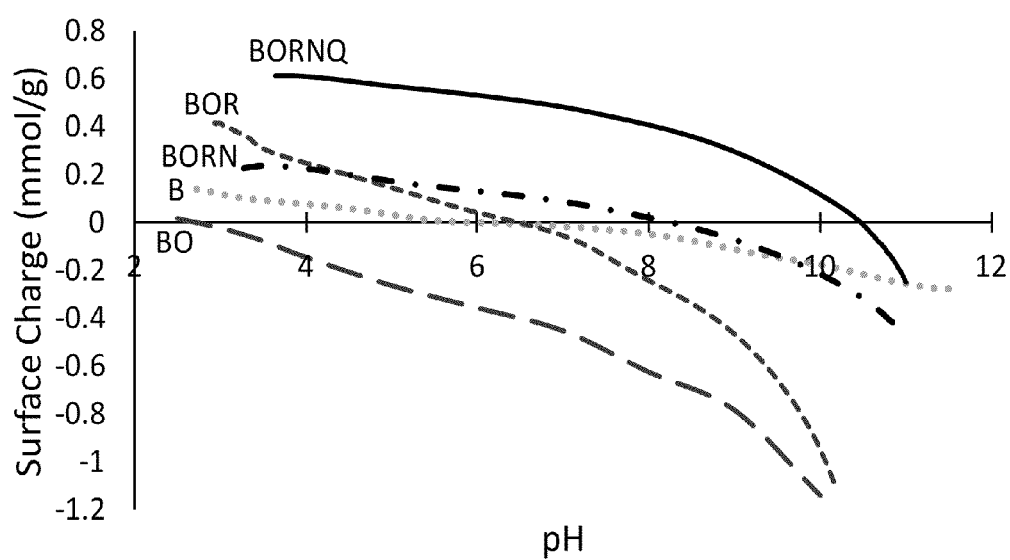
FIG. 5 is a graphical plot illustrating pH versus surface charge for bituminous GAC after different protocol steps used to produce BORNQ (see Table 1) GAC.

The protocol for making BORNQ was also characterized step-by-step by means of the Surface Charge Titration protocol (FIG. 5), from which the pH of the Point of Zero Charge during Titration ($pH_{PZCT}$) was discerned. The nitric acid oxidation step altered the GAC $pH_{PZCT}$ from 5.9 to 2.7. Then each of the successive steps raised the $pH_{PZCT}$: to 6.5 for BOR, then 8.3 for BORN, and 10.5 for BORNQ. When appraising BOR compared to BO, an upward shift in the surface charge vs. pH profile was observed which resulted from a decrease of oxygen functional groups by the reduction step (13% to 11%). This also resulted in a decrease in total surface functional groups (2.6 to 2.0 mmol/g), and some conversion of higher oxidation level oxygen functional groups to more reduced forms of oxygen functional groups.

After thermal $NH_3$ treatment (BORN), the surface charge at lower pH values decreased, which was attributed to a loss of oxygen functional groups. The increase in surface charge at higher pH values was associated with an increase in basic nitrogen functional groups. Specifically, when appraising the change from BORN to BORNQ, the quaternization step caused an upward shift in the surface charge vs. pH profile, which was associated with the quaternization of uncharged functional groups so as to create surface groups with a higher pKa, namely pyridinium. As such, the presence of pyridinium was manifested by this overall upward shift. The pKa of pyridinium exceeds pH 12, and thus cannot be measured by aqueous-based titrations.

For the bituminous GAC BORNQ (FIG. 6), the nitric acid treatment step involved pore widening as the micropore volume decreased and converted to mesopore volume. The $NaBH_4$ treatment (BOR) caused no apparent porosity change. Heat treatment with $NH_3$ further increased the mesopore volume and also enhanced the surface area. Finally, the methyl iodide quaternization reaction decreased pore volume and surface area, as the methyl groups protruding from graphene edge sites blocked micropore entrances. The trends observed for BONQ were similar to those observed for BORNQ (Table 2).

To further assess the mechanisms of porosity development, a bituminous GAC thermal treatment control (BOC) was tested in which the treatment was carried out in an inert $N_2$ atmosphere instead of the typical reactive $NH_3$ atmosphere. In this case, the cumulative micro- and meso-porosity increased nearly to the same degree as in the reactive $NH_3$ atmosphere (Table 2). The thermal decomposition of oxygen functional groups, hence, may contribute significantly to the pore widening behavior observed during thermal treatment (FIG. 6). In addition, though BOCQ had only a small percentage of N (0.83%) and only a fraction of this was pyridinic (0.21), a significant reduction in the micropore volume and surface area was observed between BOC and BOCQ. Therefore, $CH_3I$, a strong nucleophile, may be able to react with O or C sites to create protruding methyl groups which partially block the micropores of the GAC; and the decrease in porosity observed after quaternization of the tailored samples may be a combination of pore blocking from both pyridinium groups and other methylated groups formed by side reactions.

Porosity development throughout the tailoring procedure was found to be unique to each of the parent GAC materials. All four parent GACs demonstrated the same trend in porosity change for the oxidation protocol selected. Though the wood-based based GAC did not oxidize very well, it did show the same trend when oxidized. All four GACs lost both microporosity and mesoporosity as a result of oxidation via pore filling with oxygen functional groups and collapse of the graphitic structure. A similar porosity loss effect was observed for the wood-based GAC during thermal ammonia treatment. For all other GACs, the thermal treatment with $NH_3$ etched the lower microporosity to create more upper micropores and lower mesopores. Finally, all GACs showed significant reductions in micro- and meso-porosity after quaternization, which confirmed the addition of methyl groups to the GAC surface, especially converting pyridine to pyridinium.

The perchlorate removal was also tested by adsorption isotherm for bituminous GAC to confirm quaternization of the pyridine groups. After methyl iodide treatment of BON (to form BONQ), the perchlorate removal capacity increased from 5 mg perchlorate/g GAC to 21 mg/g GAC at the highest concentration tested (10 ppm starting concentration) for the same mass of GAC.

EXAMPLE 3

Electrochemical Properties and Regeneration

A pyridinium-grafted GAC that could be electrochemically regenerated was also developed. Not being bound by theory, when the pyridinium moiety is on the periphery of an aromatic matrix, it hosts redox sensitivity. When oxidized, the pyridinium hosts a positive charge that has a particular affinity for perchlorate. But when reduced, this pyridinium hosts a neutral charge; and hence no affinity for perchlorate. Thus, such a mechanism offers the possibility of sustainable cyclical redox regeneration. This could avoid the conventional ion-exchange limitation of disposing high salinity waste brine solutions, while allowing for more frequent regeneration.

To this end, the redox activity of the tailored GAC was first characterized by the Cyclic Voltammetry (CV) protocol following each of the quaternization tailoring steps (FIG. 7a). Oxidation with nitric acid (BO) introduced electroactive oxygen groups, which created a broad pseudocapacitive peak centered around 0.05 V for oxidation and –0.25 V for reduction. After sodium borohydride chemical reduction (BOR), the overall redox peak currents were diminished, which is consistent with a loss in redox-active oxygen functional groups. After thermal $NH_3$ treatment (BON), the redox peaks associated with oxygen functional groups disappeared, but the capacitance still remained higher than for the pristine bituminous GAC, with a broad pseudo-capacitive event centered at 0.5 V.

After quaternization (BONQ and BORNQ), a unique oxidation peak at 0.5 V and reduction peak at 0.3 V were observed. This reduction peak was not observed before treatment with $CH_3I$ (FIG. 7b). Thus, these peaks were attributed to reversible redox-active functional groups which are created only after quaternization, namely pyridinium and have not been previously reported for tailored activated carbon. The redox peaks associated with BORNQ were more pronounced than the peaks for BONQ, so BORNQ was selected as the focus of electrochemical regeneration experiments. It is appreciated that these voltammograms were all conducted in electrolyte that was degassed and purged with $N_2$.

Figure 8:
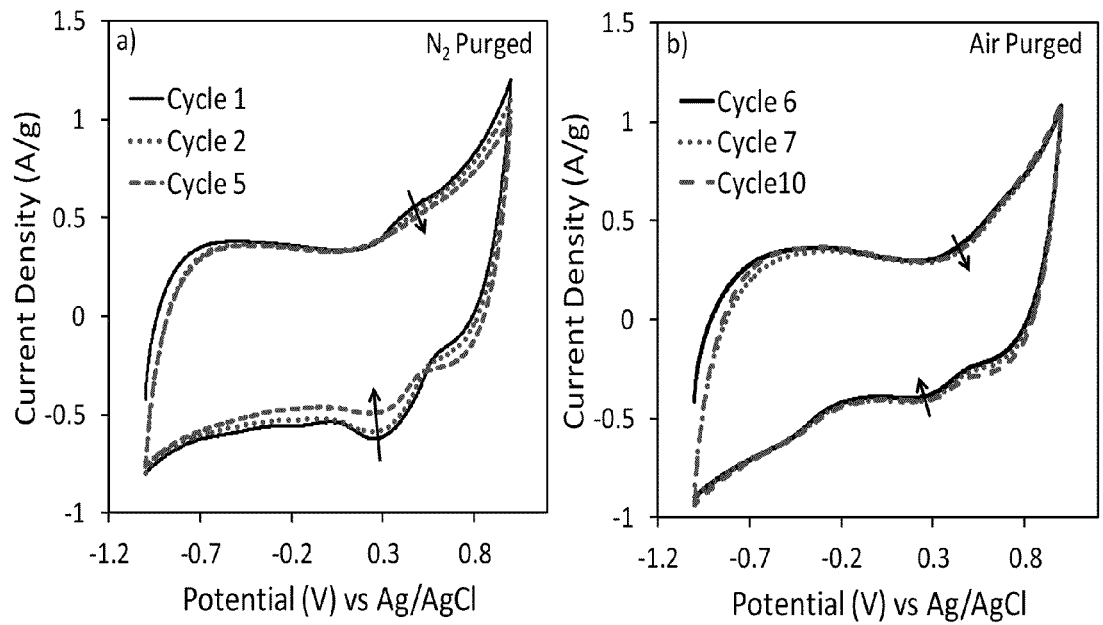
FIG. 8 is a graphical plot illustrating CV test results for BORNQ cycled through: (a) five voltammogram cycles in nitrogen ($N_2$)-purged electrolyte followed by (b) five voltammogram cycles in an air-purged electrolyte.

In order to further confirm that the redox peaks were not associated with an oxygen reduction reaction (ORR), as has often been ascribed to quaternary-N, BORNQ was cycled through five voltammogram cycles in nitrogen ($N_2$)-purged electrolyte (cycles 1-5 in FIG. 8a) and then switched to air-purged electrolyte (cycles 6-10 in FIG. 8b). During the first 5 CV cycles in $N_2$ purged electrolyte, the reduction peak and oxidation peak diminished somewhat with increased cycling. This redox behavior appears to be caused by a quasi-reversible redox process, when voltage was applied from –1V to 1V. Next, the very same BONRQ sample then experienced 5 more CV cycles, only this time purged with air (cycles 6-10 in FIG. 8b). After air purging, the redox peaks at 0.3 V and 0.5 V continued to decay. If these peaks had been associated with oxygen, such peaks should have increased with this introduction of dissolved oxygen to the electrolyte. However, the redox peak continued to decay and thus are not related to oxygen reduction reaction. In fact, during the air-purged CV cycles, a broad reduction peak developed with a shoulder at –0.25 V. This peak could be attributed to an oxygen reduction reaction.

Given the above, a quasi-reversible redox reaction occurred within the pyridinium grafted GAC (BORNQ). This redox reaction created a positive charge when BORNQ was oxidized; and it created a neutral charge when BORNQ reduced. The gradual degradation could be caused by the instability of the electron reconfiguration which takes place in the aromatic structure of the GAC graphene plane during the redox reactions of the pyridinium and pyridinium-like functional groups when the voltage is swept from –1 V to 1 V. Less voltage could cause less degradation.

Figure 9:
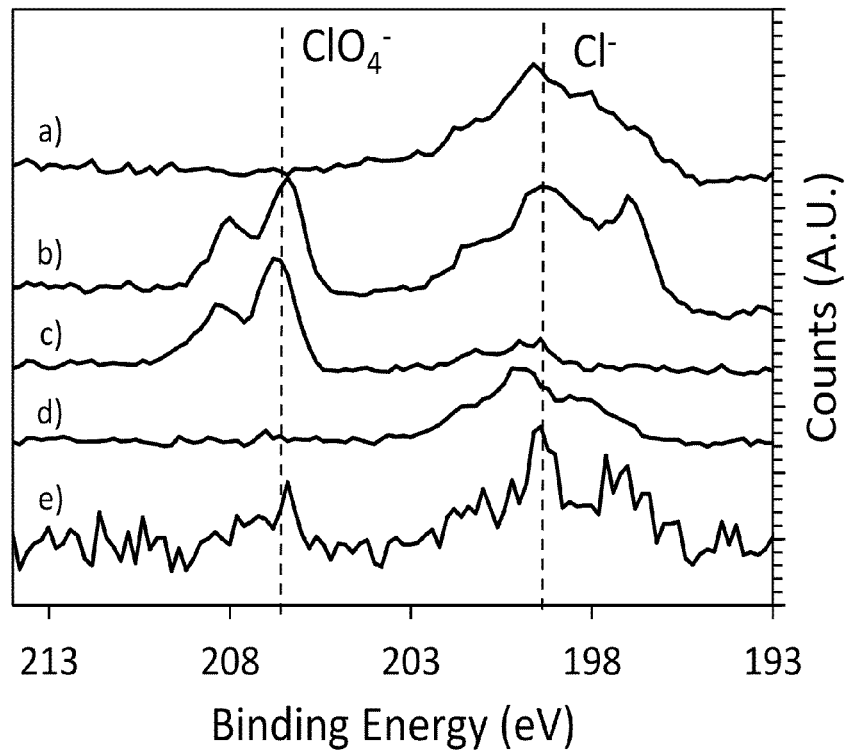
FIG. 9 is a graphical plot illustrating XPS results for four different electrochemical regeneration procedures (a-d) and one control procedure (e) conducted on BORNQ GAC to produce reduction desorption of perchlorate.

In order to confirm the electrochemical adsorption and desorption with the observed redox-active functional groups, electrochemical regeneration was performed using BORNQ as the electrode material. Four conditions were tested to provide evidence for reduction-induced desorption of perchlorate. For the first sample, the electrode was oxidized at 0.9 V for 20 minutes in 0.2 M NaCl electrolyte. The XPS response is depicted as "a" in FIG. 9 and the peaks corresponded to a $Cl^-/N$ atomic ratio of 0.37/1 and $ClO_4^-/N$ ratio of 0/1 (i.e. no $ClO_4^-$ was yet present). Next, a new electrode with fresh BORNQ was oxidized in 0.2 M NaCl while 0.02 M $NaClO_4$ was present at 0.9 V for 20 minutes. The XPS response is depicted as "b" in FIG. 9 and the peaks corresponded to a $Cl^-/N$ atomic ratio of 0.13/1 and $ClO_4^-/N$ ratio of 0.06/1. A new electrode with fresh BORNQ was placed in 0.2 M NaCl while 0.02 M $NaClO_4$ was present for 20 minutes with no voltage applied. The XPS response is depicted as "c" in FIG. 9 and the peaks corresponded to a $Cl^-/N$ atomic ratio of 0.02/1 and $ClO_4^-/N$ ratio of 0.06/1. For the fourth sample, fresh BORNQ was applied to the working electrode, and the electrode was first oxidized in 0.2 M NaCl while 0.02 M $NaClO_4$ was present at 0.9 V for 20 minutes. Then, to simulate key features of electrolytic regeneration, the same sample (after oxidation) was rinsed with DI water and then reduced in 0.2 M NaCl for 20 minutes at –0.8V. The XPS response is depicted as "d" in FIG. 9 and the peaks corresponded to a $Cl^-/N$ atomic ratio of 0.07/1 and $ClO_4^-/N$ ratio of 0/1. Thus, the reduction caused all perchlorate to be released.

The fourth sample was a control sample that excluded an applied voltage. Fresh BORNQ was loaded on the working electrode, and the electrode was oxidized in 0.2 M NaCl with 0.02 M $NaClO_4$ at 0.9 V for 20 minutes. The same sample (after oxidation) was rinsed with DI water placed in a 0.2 M NaCl electrolyte with no voltage applied. This control depicted the ion exchange behaviors that could be achieved by convential brine regeneration in 0.2 M NaCl. The XPS response is depicted as "e" in FIG. 9 and the peaks corresponded to a $Cl^-/N$ atomic ratio of 0.19/1 and $ClO_4^-/N$ ratio of 0.046/1. When comparing "b" to "e", one notes that conventional brine regeneration released only a quarter of the perchlorate, whereas electrochemical regeneration released far more of the perchlorate.

When $ClO_4^-$ was adsorbed during BORNQ oxidation ("b" and "c"), the amount of $ClO_4^-$ ions adsorbed equaled half of the amount of $Cl^-$ ions adsorbed despite a 1/10 ratio of $ClO_4^-$ to $Cl^-$ concentration in the electrolyte. Therefore, the selectivity factor for $ClO_4^-$ over $Cl^-$ equaled 4.6 with voltage applied and 28.1 with no voltage applied, herein. In addition, all $ClO_4^-$ ions detectable by XPS analysis were released in the reduction regeneration step ("c"). The control sample ("d") did not release all adsorbed $ClO_4^-$, so desorption can largely be attributed to electrochemical reduction rather than by conventional ion exchange of the electrolyte counter ion $Cl^-$. As such, $ClO_4^-$ was preferentially adsorbed following oxidation of the BORNQ electrode and then released to below detection upon electrochemical reduction.

Electrochemical regeneration was further achieved in a bulk electrochemical reaction cell. These experiments employed spent BORNQ that had experienced full breakthrough during an RSSCT with 30 ppb $ClO_4^-$ spiked groundwater. For this RSSCT, 4 ppb $ClO_4^-$ breakthrough had occurred at 4700 BV (BORNQ-1 in FIG. 10), and full breakthrough occurred at 5000 BV. This spent BORNQ was placed in the bulk electrochemical process cell and was brought into equilibrium with 0.02 M NaCl electrolyte while at a pH of 2.5. The pH of the electrolyte was lowered to 2.5 so as to provide excess protons to balance the charge of released anions. The concentration of perchlorate in solution was found to increase by a factor of 6-7.5 after reduction at –0.8 V for 20 minutes. However, only about 5% of the total perchlorate ions loaded was released during this initial batch step. The remaining perchlorate was found to desorb from the reduced media in approximately 2.5 L when washed with groundwater and in 1.5 L when washed with 0.02 M NaCl. This washing protocol was dampened by the absence of a counter redox-sensitive media that could be negatively charged when reduced so as to sorb sodium ions, and then neutrally charged when oxidized so as to release the sodium ($Na^+$) and counter balance the charge induced by $ClO_4^-$ release.

Figure 10:
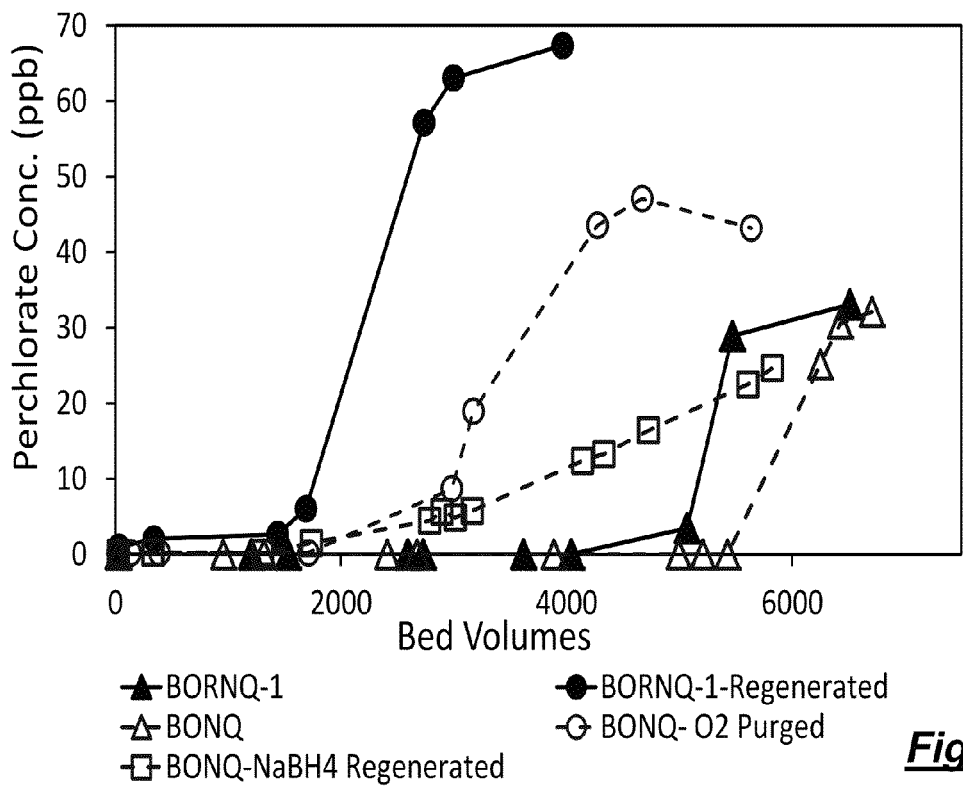
FIG. 10 is a graphical plot illustrating RSSCTs of perchlorate breakthrough by various BORNQ and BONQ GACs.

After complete perchlorate desorption, the BORNQ was reoxidized in the electrochemical cell with 0.02 M NaCl at 0.9 V for 10 minutes. The reoxidized BORNQ was then retested for perchlorate removal by RSSCT of 60 ppb $ClO_4^-$ spiked groundwater. The results exhibited 4 ppb breakthrough at 1800 BV and full breakthrough at 2900 BV (FIG. 10). As such, the regenerated BORNQ sorbed 0.24 mg perchlorate/g BORNQ, whereas in the initial RSSCT, this BORNQ had sorbed 0.25 mg perchlorate/g GAC. These results highlight the completeness of this electrochemical regeneration protocol.

A strong chemical reductant, $NaBH_4$, was also employed as another approach for redox-based regeneration in order to better understand the redox mechanism—chronologically, the $NaBH_4$ regeneration was conducted before the electrochemical regenerations. The regeneration protocol involved 50 BV of 500 mg/L $NaBH_4$ and then DI water rinsing. This protocol was applied to BONQ media that had removed 30 ppb $ClO_4^-$ from spiked groundwater purged with $O_2$ (505-510 mV ORP) until full breakthrough at 3400 BV (FIG. 10). The $NaBH_4$ regenerated GAC was able to remove perchlorate again to a 4 ppb breakthrough of 3100 BV. Also, a very gradual breakthrough was observed, which offers evidence that the oxidizing nature of the test water (ORP ~480 mV) may have been increasing the positive surface charge of the GAC through an oxidation reaction. Thus, the capacity of the original BONQ was restored and even exceeded with redox regeneration. In addition to reducing the GAC surface, the $NaBH_4$ appeared to have removed and/or reduced oxygen groups which may have been added during oxidation when processing the groundwater that had been saturated with oxygen.

EXAMPLE 4

Activated Carbon Anchored with Quaternary Ammonium/Epoxide (QAE)-forming Compounds To achieve anchoring with quaternary ammonium/epoxide-forming (QAE) compounds were grafted onto GAC; where said QAE molecules contained (a) an epoxide-forming functionality, (b) a quaternary ammonium functional group, and (c) a surfactant tail were grafted onto GAC. The epoxide-forming end of such molecules anchored to the GAC, while the quaternary ammonium group preferentially exchanged perchlorate with a carrier anion and the surfactant tail enhanced adsorption of the molecules into the GAC pores. These epoxide-forming compounds can combine with alcoholic or phenolic —OH groups; and GAC hosts such oxygenated groups. Also, the QAE molecules themselves include these —OH groups; and thus these molecules can link to one another.

Not being bound by theory, the QAE is postulated to be anchored into the activated carbon by an epoxide-induced reaction between the epoxide-forming functionality within the QAE molecule, as linked to the oxygen-containing functional groups of GAC (or of other QAE molecules; thus creating a root-like anchoring). By anchoring this functionality rather than preloading surfactants, subsequent leaching of the surfactants can be mitigated.

Bituminous coal-based Ultracarb (UC) 1240 obtained from Siemens Industry, Inc., and phosphoric acid activated wood-based Gran C Carbon (GranC) manufactured by NORIT Americas Inc were used for the QAE-anchored GACs. The UC 1240 was primarily microporous, and hosted low to moderate levels of oxygen functionality, whereas the GranC was considerably mesoporous, and hosted high levels of oxygen functionality. Prior to use in the tailoring process, the GACs were ground and sieved to a US mesh size of #200×400 (38×75 μm) in order to be the appropriate size for proportional diffusivity similitude in rapid small scale column tests (RSSCTs) in accordance with the Standardized Proportional Mini-Column Adsorber protocol. The carbon samples were then ready for use after washing and drying.

Four QAE reagents (trade name QUAB) with molecular weights of 188, 342, 360, 426 Daltons were employed to anchor to Ultracarb and GranC in this study. Each of the reagents contained a quaternary ammonium chloride, which was the active exchange site for perchlorate. Also, each contained a 3-chloro-2-hydroxy-group, which could participate in an epoxide reaction at high pH (Table 4). Yet further, each contained an alkyl hydro carbon chain tail, with width dimensions of about 4-6 Å, and length dimensions of about 10-30 Å, and these tails facilitated extensive QAE adsorption into the GAC pores.

The compounds manufactured by QUAB Chemical Company came in water solutions of 38-65% (830-3500 mmol/kg), and were 3-chloro-2-hydroxylpropyltrimethylammonium chloride (QUAB188, 65 wt %), 3-chloro-2-hydroxyl-propyldodecyldimethylammonium chloride (QUAB342, ≥38 wt %), 3-chloro-2-hydroxyl-propylcocoalkyldimethylammonium chloride (QUAB360, ≥38 wt %) and 3-chloro-2-hydroxyl-propylstearyldimethylammonium chloride (QUAB426, ≥38 wt %).

The water used in these RSSCTs experiments was the Well 17 groundwater spiked with 30-35 ppb perchlorate. The water used for the batch kinetic tests was Well 17 groundwater that had been spiked with 39 ppb perchlorate. Thus, the water processed through these RSSCTs simulated representative features of perchlorate-contaminated groundwaters The QAE-anchored GACs were prepared by suspending 1.5 grams of US #200×400 mesh GAC (GranC or UC) in a 21 mL solution of the QAE compounds (The QAE-water solution was 38-65 wt % QAE; and the QAE molecules had molecular weights of 188, 342, 360, or 426 Daltons (Table 4)). The GAC/QAE solution was then stirred at room temperature for 24 hours. After sorbing the QAE chemicals for 24 hours, the epoxide reaction was induced by adding sodium hydroxide solution into the pretreated mixture to an initial pH of 12.5 or 14 and stirring at 50° C. for 48 h. After completing the epoxide-forming reaction, dilute hydrochloric acid was added to lower the pH below 7. The solution was then cooled to room temperature; and the QAE-GAC product was washed with distilled water and reagent alcohol (90% ethyl, 5% methyl and 5% Isopropyl) in a beaker through five cycles. Next, the product was rinsed by passing distilled water over it on a #400 mesh screen to remove any residual QAE that had not reacted. Finally, the samples were dried in a vacuum oven at 50° C. for 24 h and stored in a vacuum desiccator until ready for use/testing. This preparation procedure yielded a GAC product that hosted 27-45% loading of the QAE compounds per mass balance; and this corresponded to 0.76-1.27 meq N/g initial GAC.

TABLE 4

Loading Protocol of QAE for forming QAE-Anchored GACs.

| Sample Name | Carbon source | Loading protocol | QAE | Structure |
|---|---|---|---|---|
| U188 | UC1240 | pH 12.5, 50° C., 21 mL QAE | QUAB188 ($C_6H_{15}Cl_2NO$) | Cl–CH2–CH(OH)–CH2–N+(CH3)3  Cl– |
| G188 | GranC | pH 12.5, 50° C., 21 mL QAE | | |
| U342 | UC1240 | pH 12.5, 50° C., 21 mL QAE | QUAB342 ($C_{17}H_{37}Cl_2NO$) | Cl–CH2–CH(OH)–CH2–N+(CH3)2–Lauryl  Cl– |
| G342 | GranC | pH 12.5, 50° C., 21 mL QAE | | |
| U360 | UC1240 | pH 12.5, 50° C., 21 mL QAE | QUAB360 ($C_{13-23}H_{29-49}Cl_2NO$) | Cl–CH2–CH(OH)–CH2–N+(CH3)2–Cocoalky  Cl– |
| U360H | UC1240 | pH 14, 35° C., 15 mL QAE | | |
| G360 | GranC | pH 12.5, 50° C., 21 mL QAE | | |
| U426 | UC1240 | pH 12.5, 50° C., 21 mL QAE | QUAB426 ($C_{17-32}H_{37-49}Cl_2NO$) | Cl–CH2–CH(OH)–CH2–N+(CH3)2–Stearyl  Cl– |
| G426 | GranC | pH 12.5, 50° C., 21 mL QAE | | |
| UC w/NaOH | UC1240 | pH 14, 35° C., no QAE | none | none |

The above protocols were selected as the more favorable ones following an appraisal of various conditions that included a range of temperatures (25° C.-75° C.), pH (11-14), QAE dose (6.5 mL-23.5 mL), QAE molecular weight (188-426 Daltons), and activated carbon source (wood-based GranC or bituminous-based UC). Amongst this broad range of preparation conditions, the ones that appeared to offer higher perchlorate sorption during preliminary batch adsorption tests include those listed in Table 4 below. Table 4 also presents the preparation conditions of several QAE-anchored GACs that were tested.

Figure 11:
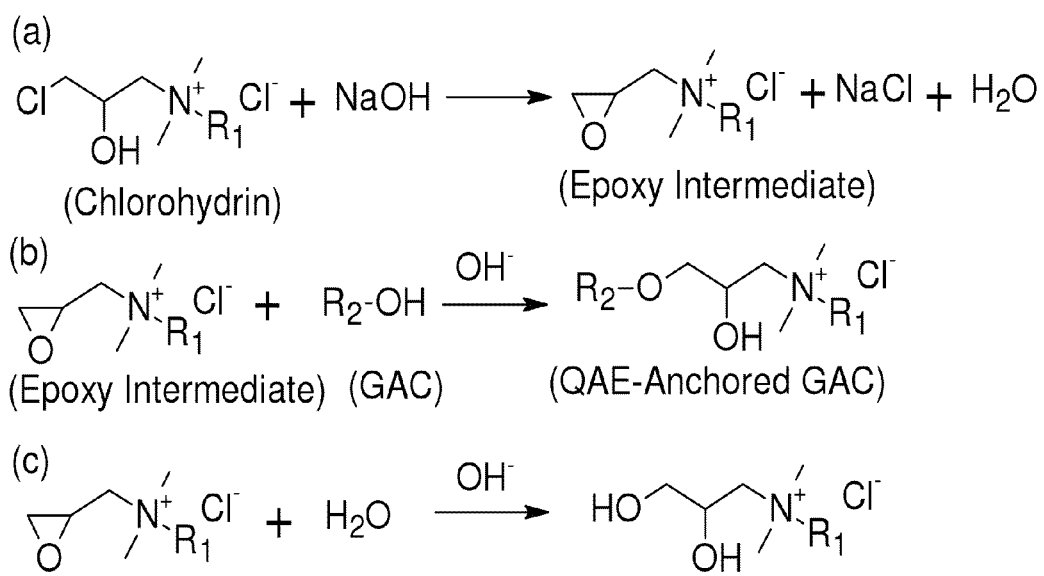
FIG. 11 is a chemical model illustrating loading and anchoring quaternary ammonium/epoxide-forming compounds (QAE) onto GAC.

The process for loading and anchoring quaternary ammonium/epoxide-forming compounds (QAE) onto granular activated carbon included the following steps: (1) the chlorohydrin form of the reagent was adsorbed onto the GAC, with adsorption enhanced by the surfactant tail of the reagent; (2) the chlorohydrin form of the reagent was converted to the epoxy intermediate in the presence of sodium hydroxide (FIGS. 11a); and (3) the epoxy reacted with the graphene layer hydroxyls or other oxygen functional groups which anchored the quaternary ammonium molecule. Not being bound by theory, the third step effectively attached the quaternary ammonium cation by the epoxide anchor to the GAC surface (FIG. 11b). It is noted that the epoxy could also have been converted to 2,3-dihydroxy derivatives (FIG. 11c) and these hydroxyls could in turn have reacted with the epoxides of adjacent QAE molecules in a manner that created a multi-branched non-leachable extended structure that was effectively rooted within the GAC pores.

The GACs' surface charge distributions were monitored by the Surface Charge Titration protocol, while using the Mettler Toledo DL53 titrator (Mettler Toledo, Inc., Columbus, Ohio) which measured the total net surface charge distribution over a broad pH range. Titrations started at low pH (2.5), and then proceeded to high pH (12) as NaOH was incrementally added. The equilibrium time between every NaOH incremental additions was until the pH variation was less than 0.01 pH units/s. Two NaCl solutions (0.01 and 0.1N) were used as electrolytes in the titration. From the point where this data crossed zero on the y-axis, the pH of the point of zero charge within the pores ($pH_{pzcp}$) could be discerned.

Adapted Batch Adsorption Isotherm tests were conducted using a bottle-point method. Carbon samples of 0.02 g (QAE-loaded mass) were consistently employed, so as to use these carbons sparingly. Specifically, 0.02 g of QAE-anchored carbons were mixed with 23 mL of deionized-distilled water that had been spiked with perchlorate at levels of 102.3 ppb, 350 ppb, 1.2 ppm, 4 ppm, 13.5 ppm, 50 ppm and 100 ppm. These were mixed in sealed glass bottles by shaking them on a rotary shaker for 24 h at room temperature. After that, the carbon particles were filtered through 0.45 μm nylon fiber filters and the aqueous-phase perchlorate concentration ($C_e$) was monitored. The test was repeated at each perchlorate concentration, and duplicates varied by less than 3-5%.

Figure 12:
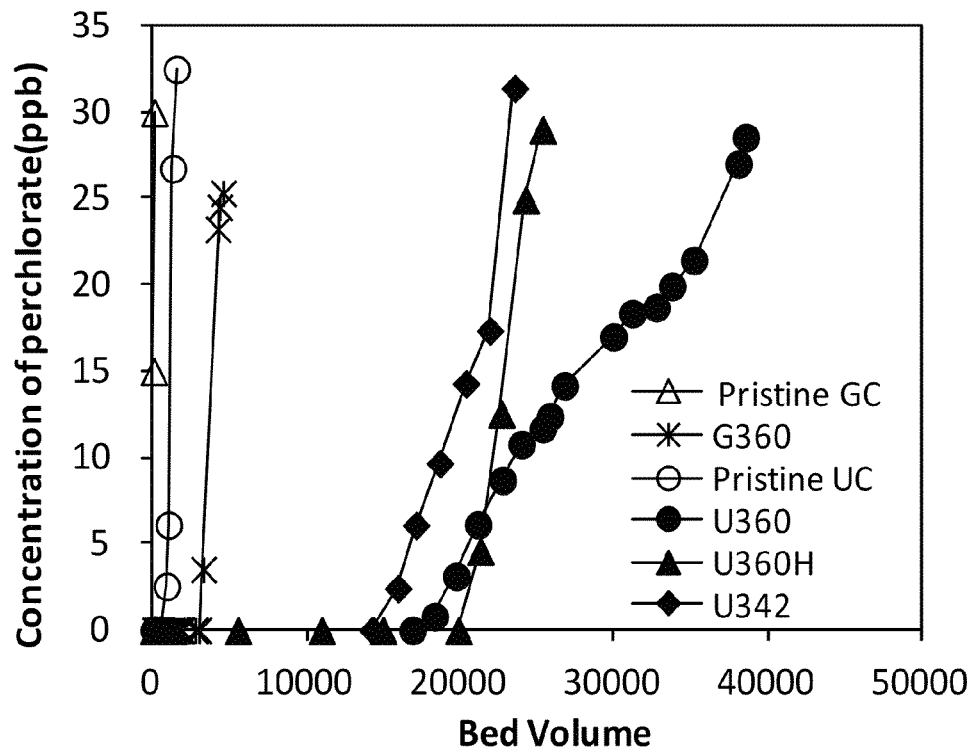
FIG. 12 is a graphical plot illustrating RSSCTs of perchlorate breakthrough by various QAE-anchored GAC samples labeled in Table 4.

RSSCTs in accordance with the Standardized Proportional Mini-Column Adsorber protocol for perchlorate appraised the bed volumes to perchlorate breakthrough for the UC that had been pre-anchored with 360 Dalton QAE at pH 12.5 (U360) and pH 14 (U360H), and with 342 Dalton QAE at pH 12.5 (U342). RSSCTs were also conducted for the GranC that had been pre-anchored with 360 Dalton QAE at pH 12.5 (G360). The RSSCT perchlorate breakthrough behavior showed that the UC that had the QUAB 360 pre-anchored exhibited the longest bed life for removing perchlorate (FIG. 12). Specifically, the U360H removed perchlorate in the effluent to below 2 ppb (the Massachusetts standard) for 21,000 bed volumes; and to below 4 ppb for more than about 20,000 bed volumes when processing the groundwater that had been spiked with 30-35 ppb perchlorate at pH 7.5. The U360H exhibited a sharper breakthrough than did the U360 (i.e. longer BV to 4 ppb perchlorate breakthrough). When discerning perchlorate loading at full breakthrough by integrating the area above the curve, it is noted that U360 adsorbed 1.17 mg perchlorate/g U360 and this was 20% higher than for U360H (0.95 mg/g). These two values corresponded to 1.4-1.7% of quaternary ammonium sites hosting a perchlorate ion at full breakthrough.

The U342 achieved nearly as long a bed life to 4 ppb breakthrough as U360H (more than 18,000 BV), which was considerably longer than for the GranC carbon (G360) that only lasted to 3300 BV. The pristine activated carbons lasted only 40 and 870 BV. It is noted that all the FIG. 12 bed volumes are on the actual basis of L water/L bed column and the effluent pH remained stable at 7.5±0.2 throughout these RSSCTs.

It is also noted that there was no leaching of the quaternary ammonium detected when the RSSCT column effluent was monitored by the Tsubouchi Two-Phase Titration protocol. Specifically for the RSSCT run of U360 shown in FIG. 12, samples drawn at 40, 60 and 15,000 BV revealed no quaternary ammonium leaching (detection limit was 0.1-0.2 ppm). Also, for the U360H run shown in FIG. 12, no leaching was detected at similar BVs. Thus, the epoxide-based anchoring of these QAE molecules overcame the leaching issues observed for the use of mere quaternary ammonium surfactants.

Figure 13:
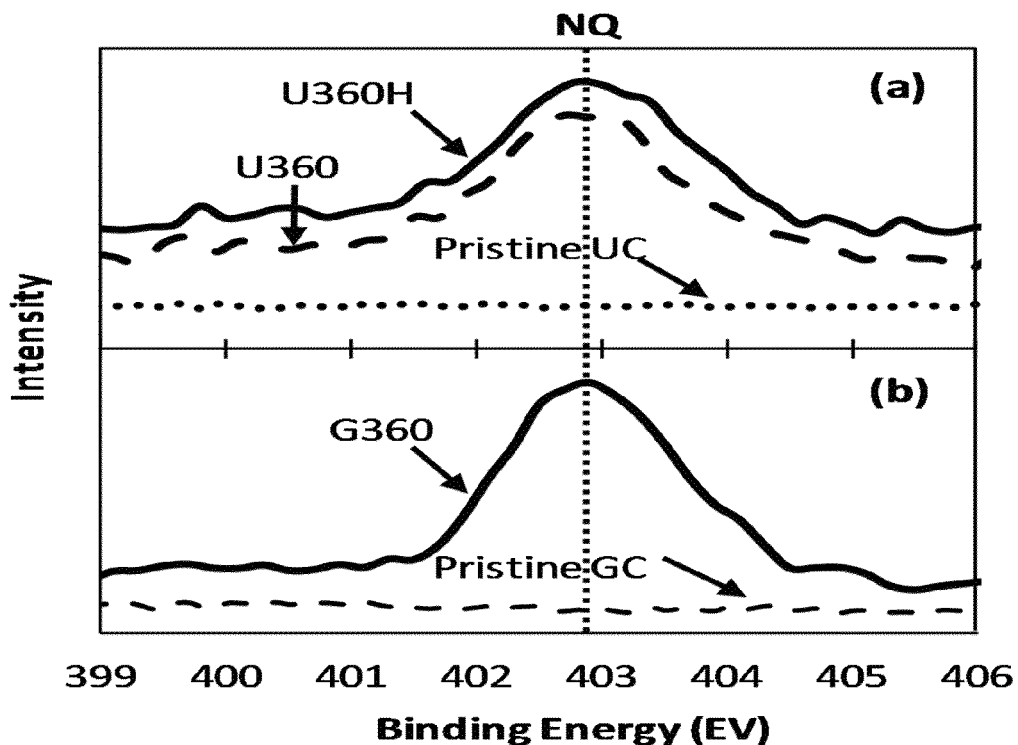
FIG. 13 is a graphical plot illustrating XPS results characterizing nitrogen functionality for three QAE-anchored GACs.

XPS analyses were employed in the binding energy range of 394 to 410 eV so as to characterize the nitrogen functionality for QAE-anchored activated carbons. As shown in FIG. 13, the three QAE-anchored GACs (U360, U360H and G360) exhibited prominent peaks in the nitrogen-as-quaternary ammonium (NQ) range of 402.6-402.9 eV, whereas XPS detected no NQ peaks in the pristine GACs. These results, coupled with the surface charge characterization (FIG. 14), were taken as evidence that the QAE protocol was successful in anchoring quaternary ammonium functionality into activated carbons. As further evidence, no leaching of quaternary ammonium was detected when the RSSCT column effluent was monitored by the dye protocol.

The NQ-type nitrogen results—as discerned by XPS are been presented in Table 5 along with oxygen and C—Cl XPS elemental results. As shown, the QAE-anchoring added 1-1.3% N (atomic % basis) to the pristine GACs per XPS; and most of this was NQ-type. Notably, XPS detected no C—Cl bonds (i.e. considerably less than 0.1 atomic percent); and this provided further evidence that the reaction that converted C—Cl bonds to epoxide proceeded to full completion. The pristine GranC contained far more O (10.4 Atomic %) than did the pristine UC (5.3 Atomic %); and this distinction could have affected QAE-anchoring configurations.

Boehm titrations characterized the oxygen functional groups of pristine UC and GranC, and highlighted the distinctions in their origin (Table 5). The wood-based GranC hosted considerable levels of these functional groups (1.0 mmol/g), whereas the bituminous-based UC hosted only 0.15 mmol/g of these.

Figure 14:
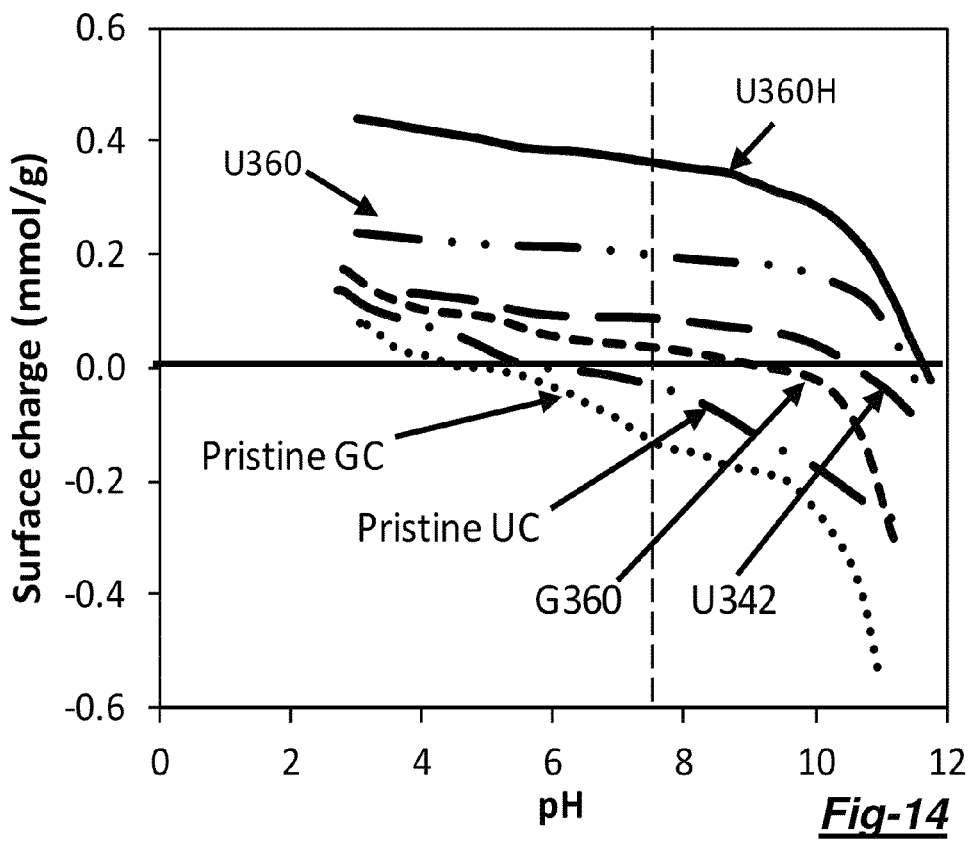
FIG. 14 is a graphical plot illustrating pH versus surface charge for two pristine GACs and four QAE-anchored GACs.

The surface charge distribution of the QAE-anchored GACs and the pristine GACs were characterized by the Surface Charge Titration protocol, as shown in FIG. 14. There was a significant increase in positive surface charge for all the QAE-anchored GACs, as compared with their pristine carbon counterparts. This result was attributed to the anchoring of QAE compounds into the GAC. Of particular interest of this work was the surface charge at pH 7.5, which corresponded to the pH of the Well 17 groundwater. Specifically, the U360H exhibited the highest positive surface charge (0.364 mmol/g at pH 7.5), followed in descending order by U360, U342 and G360 (FIG. 14 and Table 5). In contrast, the pristine UC and GranC exhibited negative surface charge at pH 7.5. This order of surface charge distribution is consistent with the RSSCT bed life for the QAE-anchored GACs.

The titrations also revealed the $pH_{pzcp}$, which reflects the internal surface charge distribution, as being the highest for the U360 and U360H (11.41-11.63) (Table 5). In comparison, the $pH_{IEP}$ (pH of isoelectric point per the Zeta potential protocol) reflected the external surface charge distribution (Table 5). As shown, the $pH_{IEP}$ values were 2.4-2.9 units lower than their $pH_{pzcp}$ counterparts, which indicated the quaternary ammonium charge had developed more internally than externally as was desired.

Another measure of quaternary ammonium activity was gleaned by comparing the surface charge of the QAE-anchored GACs with their pristine GAC counterparts (FIG. 14). For example, the change in surface charge achieved by U360H at pH 7.5 was computed as (0.37 mmol/g GAC-QAE)×(1.45 g GAC-QAE/1.0 g initial GAC)−0.01 mmol/g initial GAC=0.53 mmol surface charge/g initial GAC. Over the pH 7-11 range, this change in U360H surface charge spanned 0.5-0.6 mmol surface charge/g initial GAC. In addition, the proportion of N that exhibited a surface change was further calculated when dividing the change in surface charges by the surface charge at pH 7.5. These computed changes in surface charge and the proportion of N that exhibited a surface change appear in Table 5.

TABLE 5

Physical and Chemical Properties of Pristine and QAE-Anchored GACs

| Method | Sample Name | Pristine GranC | G360 | Pristine UC | U360 | U360H |
|---|---|---|---|---|---|---|
| ASAP Argon Adsorption | Micropore volume (mL/g) | 0.33 | 0.11 | 0.30 | 0.03 | 0.05 |
| | Mesopore volume (mL/g) | 0.66 | 0.41 | 0.13 | 0.07 | 0.09 |
| | BET-SA(<20 Å, m2/g) | 677 | 197 | 797 | 54 | 108 |
| X-ray PS (elements exposed on surface) | NQ-type $N^2$ (At %) | 0.53 | 1.53 | $ND^1$ | 1.19 | 1.27 |
| | C—Cl (At %) | | $ND^1$ | | $ND^1$ | $ND^1$ |
| | O (At %) | 10.40 | 9.50 | 5.29 | 6.94 | 6.27 |
| QAE Loading | Loading of QAE (wt %) | — | 45 | — | 28 | 27.5 |
| Mass Balance | mM NQ added/g initial GAC | — | 1.38 | — | 0.86 | 0.85 |
| | mM O added/g initial GAC | — | 1.38 | — | 0.86 | 0.85 |
| Ratios of XPS vs. QAE average bulk | N per XPS/N per QAE load | — | 0.9:1 | — | 1.4:1 | 1.5:1 |
| | O per XPS/N per QAE load | — | 1.5:1 | — | 3:1 | 2.3:1 |

TABLE 5-continued

Physical and Chemical Properties of Pristine and QAE-Anchored GACs

| Method | Sample Name | Pristine GranC | G360 | Pristine UC | U360 | U360H |
|---|---|---|---|---|---|---|
| | loadings O-XPS/O-QAE//N-XPS/N-QAE | — | 1.6 | — | 2.2 | 1.5 |
| Boehm Titrations (with standard deviations) | Carboxylic-like $O^3$ (mmol/g) | 0.36 ± 0.006 | — | 0.01 ± 0.001 | — | — |
| | Lactonic-like $O^3$ (mmol/g) | 0.34 ± 0.003 | — | 0.08 ± 0.005 | — | — |
| | Phenolic-like $O^3$ (mmol/g) | 0.31 ± 0.015 | — | 0.06 ± 0.002 | — | — |
| | Sum | 1.01 | — | 0.15 | — | — |
| Surface Charge Titrations | Surface charge at pH = 7.5 | −0.13 | 0.04 | −0.03 | 0.20 | 0.36 |
| | Change in Surface charge (mmol/g, in pH 7-11 range) | — | 0.15-0.2 | — | 0.2-0.35 | 0.5-0.6 |
| | Proportion of N that exhibits a surface change | — | 16-21% | — | 30-50% | 75-90% |
| | Ratio of Boehm O/added N (mmol/mmol) | — | 0.73:1 | — | 0.17:1 | 0.17:1 |
| | $pH_{pzcp}$ | 4.73 | 9.32 | 5.92 | 11.41 | 11.63 |
| | $pH_{IEP}$ | 6.1 | 7.4 | 7.3 | 8.5 | 9.2 |
| Batch Adsorption Tests | $Q_e$ (mg/g) (after $C_o$ = 50 ppm) | 3.5 | 22.6 | 6.6 | 28.4 | 32.3 |
| | Langmuir $Q_{max}$ (mg/g) | 4.3 | 21.1 | 9.2 | 29.2 | 33.2 |
| | % QA occupied by perchlorate at $Q_{max}$ | — | 22 | — | 44 | 50 |
| RSSCTs | BV to $BT^4$ (of 2 ppb) | 40 | 3300 | 870 | 18,300 | 21,300 |
| | "Apparent density" in RSSCT column (g/mL) | 0.291 | 0.425 | 0.568 | 0.728 | 0.725 |
| | % QA occupied by perchlorate at full breakthrough | — | 0.28 | — | 1.7 | 1.4 |

[1]ND means Not Detected, i.e. considerably less than 0.1 atomic percent.
[2]NQ-type N is Quaternary Ammonium
[3]O is oxygen
[4]BV to BT means Bed Volumes to Breakthrough of 2 ppb perchlorate when processing Penn State ground water that had been spiked with 30 ppb perchlorate, One Bed Volume = 0.8 mL The NQ-type nitrogen results—as discerned by XPS are shown in Table 5, along with oxygen and C—Cl XPS elemental results. The QAE-anchoring added 1-1.3% N (atomic % basis) to the pristine GACs; and most of this was NQ-type. Notably, XPS detected no C—Cl bonds and this provided further evidence that the reaction that converted C—Cl bonds to epoxide proceeded to full completion.

Figure 15:
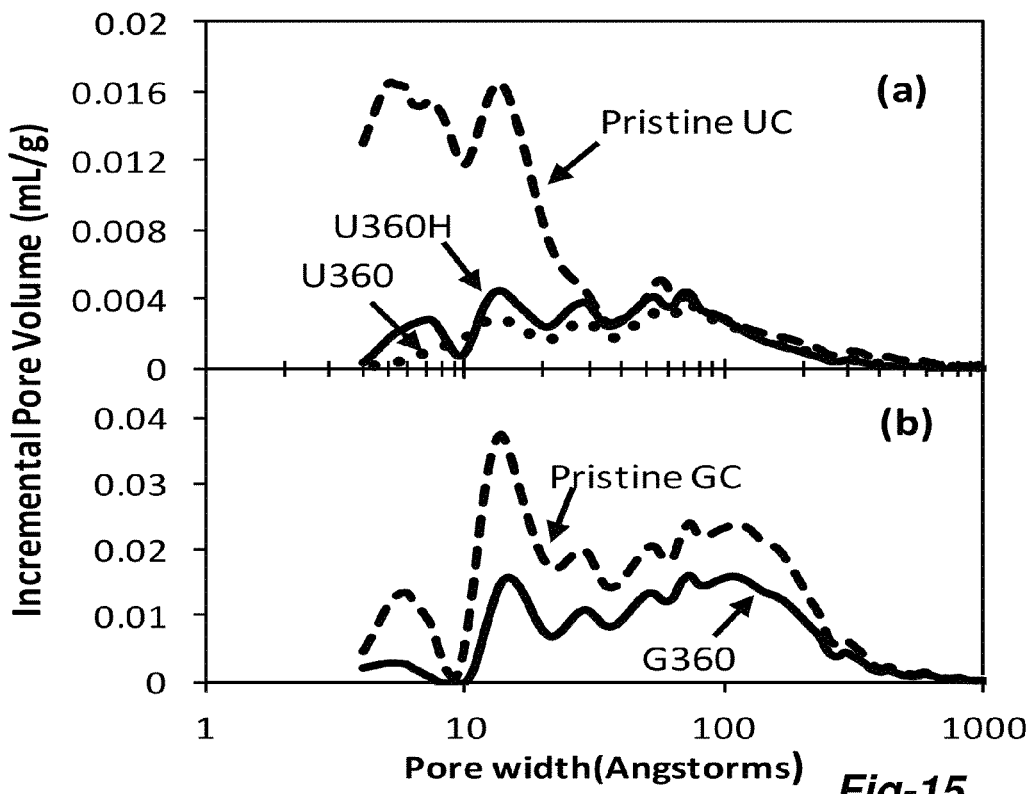
FIG. 15 is a graphical plot of pore width versus cumulative pore volume for two pristine GACs and three QAE-anchored GACs.

As shown by the incremental pore volume distributions (FIG. 15), the QAE occupied most of the <30 Å wide pores in the UCs, but only slightly diminished pore volume in pores >30 Å wide. In comparison, when QAE was anchored into the GranC, it diminished pore volumes by half throughout the full range of pores from 4 to 500 Å. These results infer a different arrangement of the QUAB 360 in the UC than in the GranC.

Figure 16:
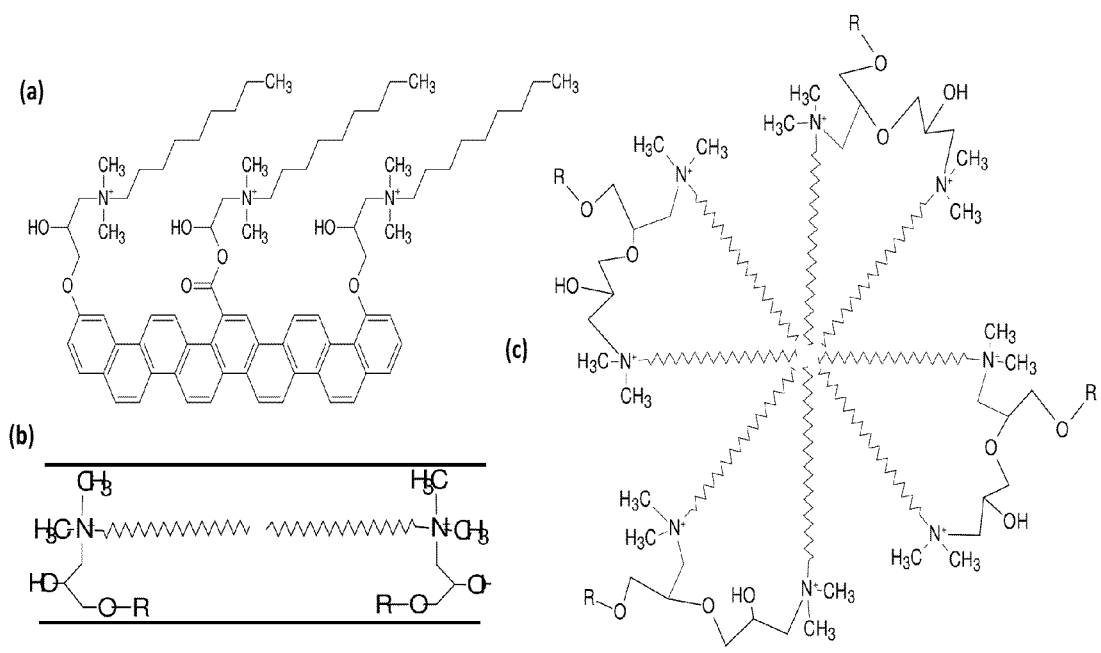
FIG. 16 is a chemical model illustrating configurations of quaternary ammonium and epoxide (QAE) compounds within activated carbon.

A higher proportion of the QAE's N and O exhibited an XPS "surface" signal for the U360 and U360H than for G360 (Table 5 Rows 11 and 12). As such, more N and O was hidden "behind" graphene planes and/or surfactant tails in the G360 than for the U360 and U360H. This result is consistent with the FIG. 16 mechanistic models.

EXAMPLE 5

Removal of Sulfate with Polypyrrole in GAC

The introduction of redox active pyrrole as polypyrrole onto the GAC surface and into the GAC pores was explored for the purpose of removing sulfate. The polypyrrole offered a high density of the functional groups which are able to be electrochemically regenerated, much larger than the amount which could be produced by surface chemistry alteration. These conducting redox active polypyrroles were lined onto and into the GAC.

Pyrrole, which is a clear monomer liquid which polymerizes when exposed to air or light, turning the liquid brown, was used as a source for redox active polypyrrole. To enhance and ensure the purity of the as-received pyrrole, the pyrrole was distilled under a nitrogen atmosphere. The distilled pyrrole was then stored in a sealed bottle wrapped in aluminum foiled. The bottle was vacuum evacuated and then purged and filled with nitrogen gas. All work done with pyrrole was performed in an anaerobic glove box or by anaerobic transfer between bottles.

Pyrrole was first polymerized electrochemically onto bituminous and hardwood GAC to test the redox ability of the polypyrrole/GAC composite. Polymerization was achieved by chronoamperotometric treatment at 0.8 V vs Ag/AgCl in 0.02M to 0.5M pyrrole with 0.2M NaCl electrolyte at 30° C. After polymerization the electrode was removed, washed with DI water, and placed in degassed 0.2M NaCl electrolyte for as many as 50 CV cycles. Electrochemical polymerization was also achieved by placing 1-2 g of GAC into the bulk electrochemical process cell. The GAC was allowed to mix for 2-16 hours with 0.25 M pyrrole in 0.2 M NaCl inside an anerobic glove box. Polymerization was also achieved by chronoamperotometric treatment at 0.8 V vs Ag/AgCl at 30° C. After polymerization the GAC/polypyrrole composite was washed with DI water and allowed to dry at 60° C. in a vacuum oven.

Pyrrole was also electrochemically polymerized on GAC in a bulk electrochemical synthesis cell and the resultant composite was tested for sulfate removal ability. The presence of the polypyrrole film was confirmed by XPS, SEM and sulfate removal ability.

Figure 17:
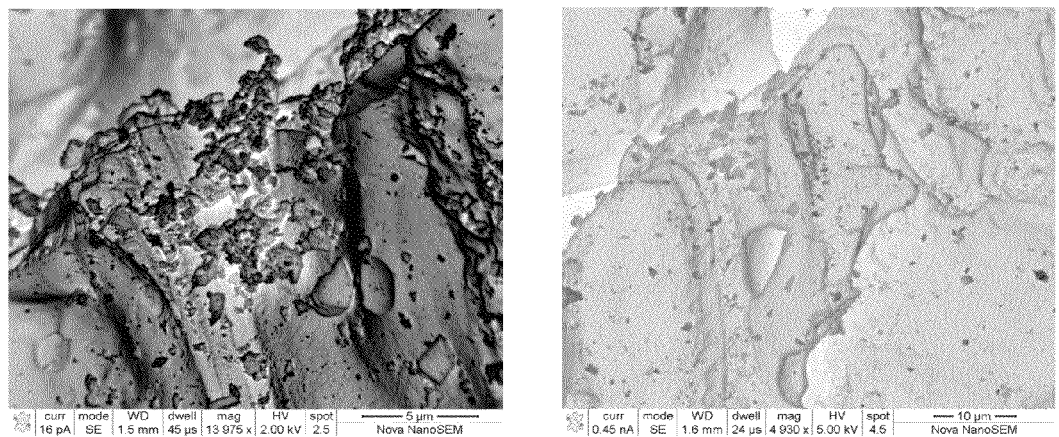
FIG. 17 is a scanning electron microscopy (SEM) image showing pyrrole polymerized on a GAC electrode using electrochemical polymerization.
Figure 18:
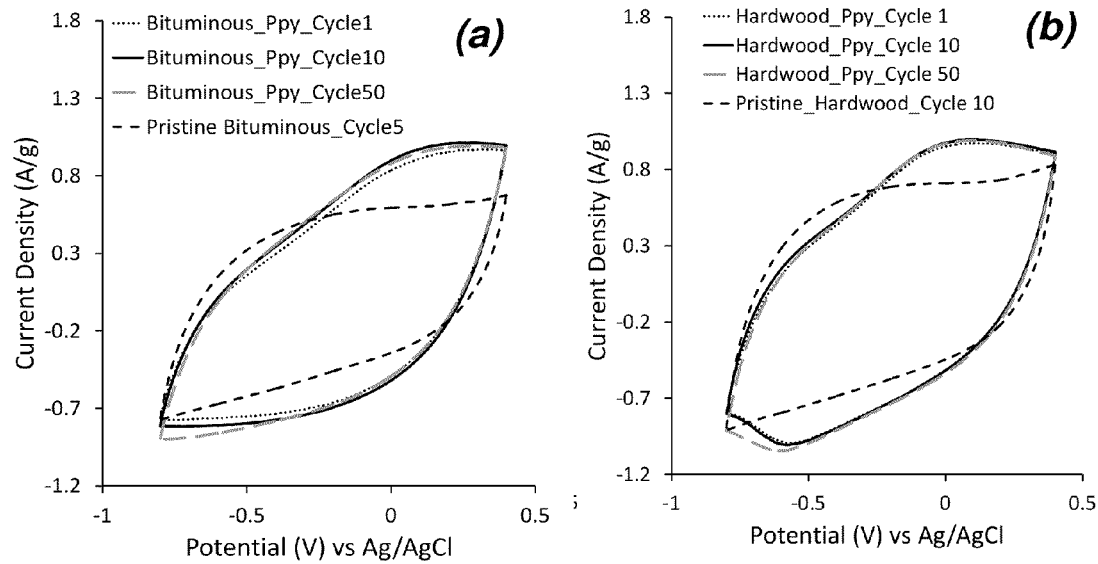
FIG. 18 is a graphical plot illustrating 1, 10 and 50 cycles of CV testing on: (a) bituminous GAC with and without polypyrrole polymerized thereon; and (b) hardwood GAC with and without polypyrrole polymerized thereon.

After pyrrole was chemically or electrochemically polymerized on the GAC electrode (FIG. 17), the resultant GAC/polypyrrole composites were tested by cyclic voltammetry to assess their electrochemical behavior (FIG. 18). Redox peaks were observed at similar locations on both of the GACs, and the redox behavior was found to be stable to at least 50 cycles, as there was little deterioration in the peak current values. For the bituminous GAC composite, the oxidation peak (positive charge) appeared near −0.1 V and the reduction peak (neutral charge) appeared at near −0.3 V. Both peaks were relatively broad, spanning across a wide range of potentials. For the hardwood GAC composite, the oxidation peak appeared at −0.05 V and the reduction peak appeared at −0.6 V. These peaks were very well defined. The values and peak shapes for the bituminous GAC/polypyrrole composite correspond well with those obtained for carbon nanotube/polypyrrole composite in the prior art, while the hardwood GAC/polypyrrole composite peak values and shapes correspond well with those observed for a graphene/polypyrrole composite. The interaction of the polypyrrole with the platform materials, therefore, has some impact on the electrochemical properties of the composite.

Chemical polypyrrole loading of the GAC was achieved by first loading pyrrole monomer onto the surface of GAC for 16 hours by taking 23 mL of solutions with molarities of 0.1, 0.3, 0.5, 0.8, 1, 2, 3, or 5 M pyrrole solution and mixing it with 5 grams of either bituminous or hardwood GAC, as depicted in Table 6. After pyrrole loading, the GAC was separated by glass fiber filtration and added to 2-4 M Ferric Chloride (Mallinckrodt Chemicals) for 6 hours. The ferric chloride acted as a chemical initiator of polymerization. The GAC was then washed with DI water and dried at 60° C. in a vacuum oven.

TABLE 6

| Name of RGC | Pyrrole concentration(mol/L) | FeCl$_3$ concentraion(mol/L) |
|---|---|---|
| VR | — | — |
| RP0.02 | 0.02 | 0.5 |
| RP0.1 | 0.1 | 0.5 |
| RP0.3 | 0.3 | 1.5 |
| RP0.5 | 0.5 | 0 |
| RP0.8 | 0.8 | 1.5 |
| RP1 | 1 | 2 |
| RP2 | 2 | 2 |
| RP5 | 5 | 0 |

Figure 19:
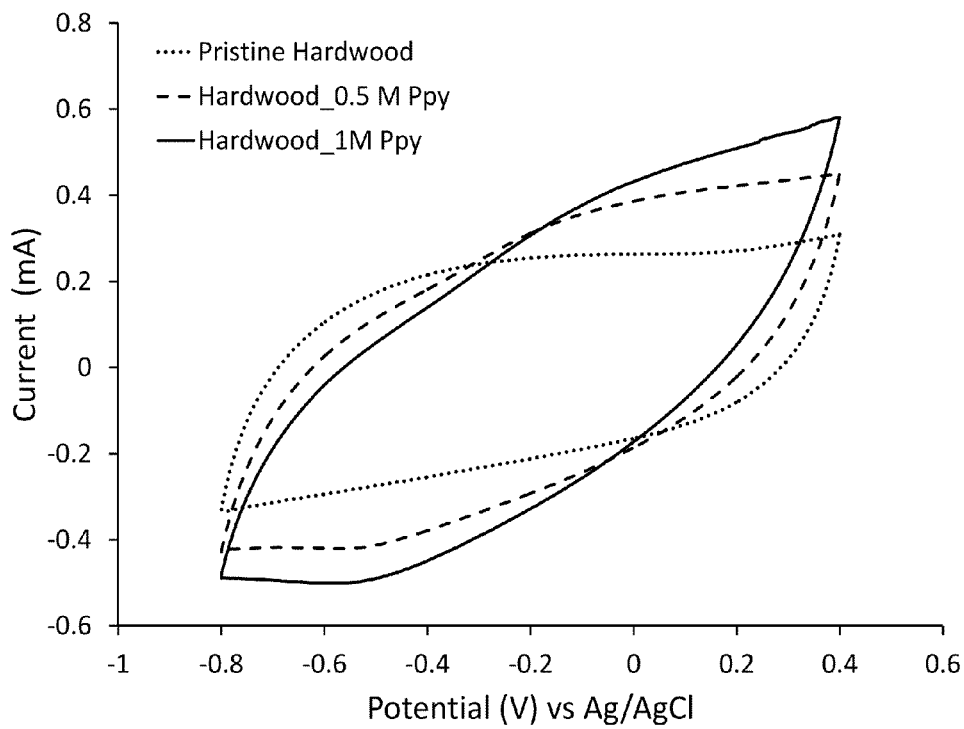
FIG. 19 is a graphical plot illustrating CV test results for pristine hardwood GAC and hardwood GACs chemically polymerized using 0.5M and 1M pyrrole solutions.
Figure 20:
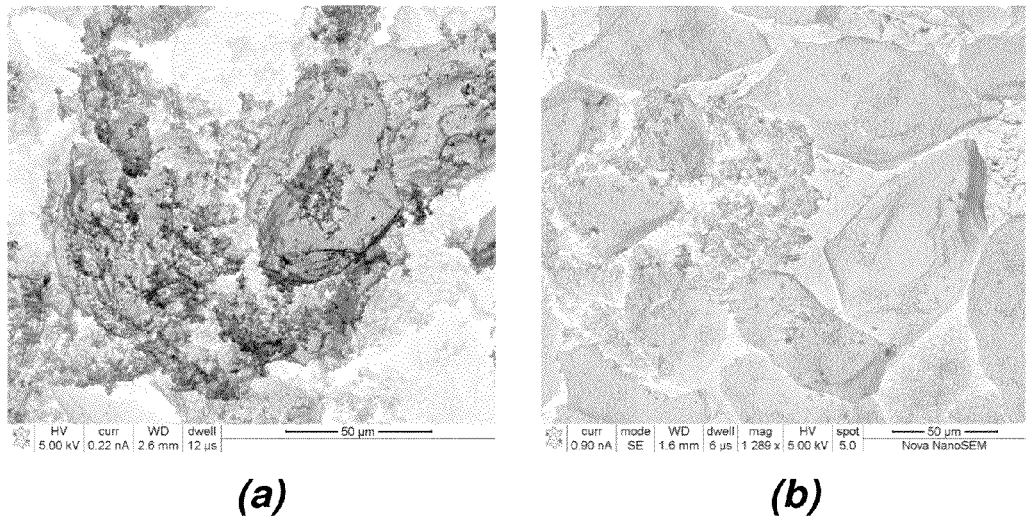
FIG. 20 is an SEM image showing pyrrole polymerized on a GAC electrode using chemical polymerization.

The effect of the concentration of pyrrole during polymerization was studied by exploring electrochemical behavior and sulfate removal ability. The characteristic electrochemical properties only became prominent after at least 0.5 M pyrrole was used during polymerization. The height of the oxidation and reduction further increased with higher pyrrole content (FIG. 19). The peaks were not as well defined as those produced by electrochemical polymerization on the GAC electrode. The polypyrrole films were also visible by SEM with even larger polypyrrole film patches visible on the external surface of the GAC grains than those visible for the electrochemical polymerization protocol (FIG. 20).

Figure 21:
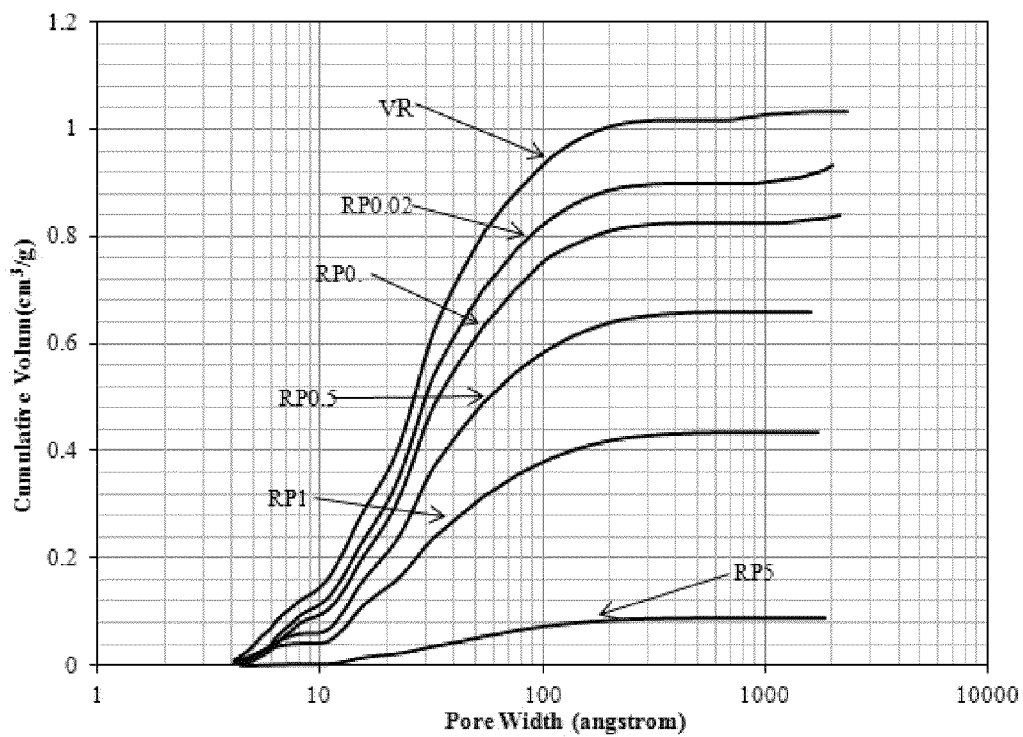
FIG. 21 is a graphical plot of pore width versus cumulative pore volume for pristine or virgin (VR) GAC and five polypyrrole polymerized GACs labeled in Table 6.

Pore volume distribution and surface area were determined to compare the differences between virgin RGC and Polypyrrole-grafted RGC (Ppy-grafted RGC) with FIG. 21 showing their cumulative pore volume distribution. All the Ppy-grafted RGC has a decrease of pore volume, which suggests that Ppy has deposited on the internal surfaces of RGC, and occupied the internal pore volumes. Both surface area and pore volumes show a trend of decrease with the increase of Pyrrole concentration. This phenomenon is because the thickness of Polypyrrole depends on the Pyrrole concentration.

Figure 22:
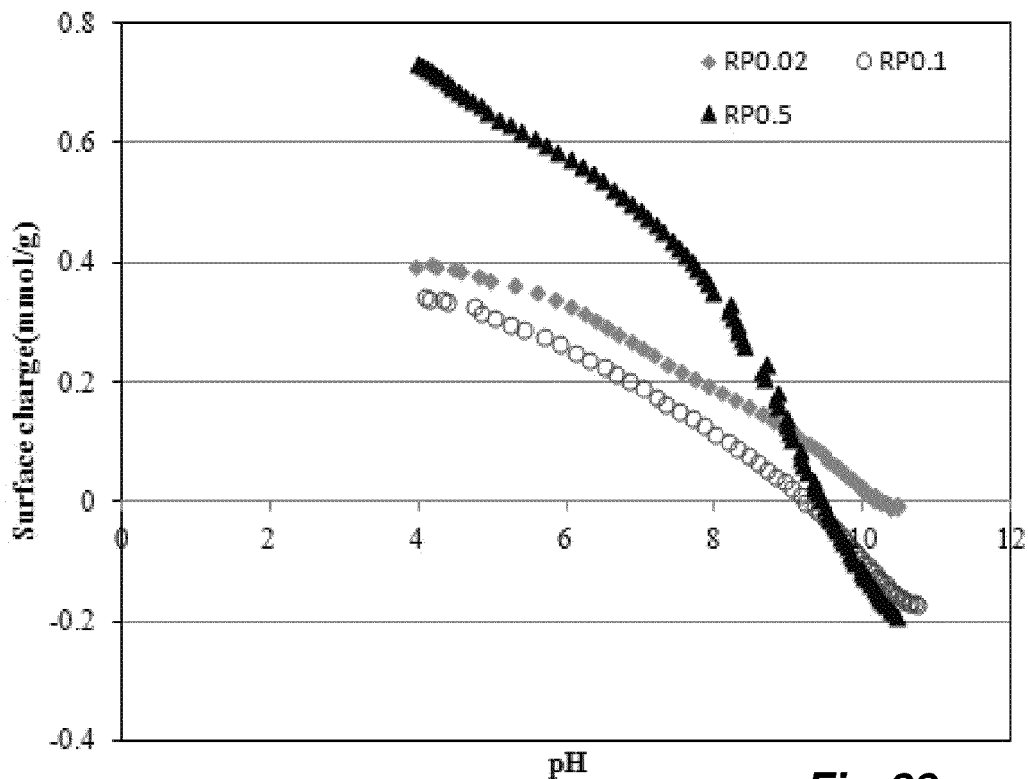
FIG. 22 is a graphical plot illustrating pH versus surface charge for three polypyrrole polymerized GACs.

The surface charge of some of the Ppy-grafted RGC was characterized as shown in FIG. 22. There was obviously increase of positive surface charge as the Py concentration increased. At pH of 8, RP0.5 hosted 0.4 mmol/g surface charge, which was of benefit for absorbing sulfate from an acid mine drainage water.

Oxyanion adsorption isotherms were conducted using a bottle-point method. The isotherms used only 0.02 g of GAC for each isotherm point, so as to use these carbons sparingly. Specifically, 0.02 g of GAC was mixed with 23 mL of DI water that had been spiked with sulfate at levels of 10, 50, 100, 250, 400, and 500 ppm. These were mixed in sealed glass vials by shaking them on a rotary shaker for 24 h at room temperature. After that, the carbon particles were removed on a 0.45 μm nylon fiber filter (VWR); and the separated solution was analyzed for perchlorate concentration. The test was repeated at each perchlorate concentration, and duplicates varied by less than 3-5%.

Figure 23:
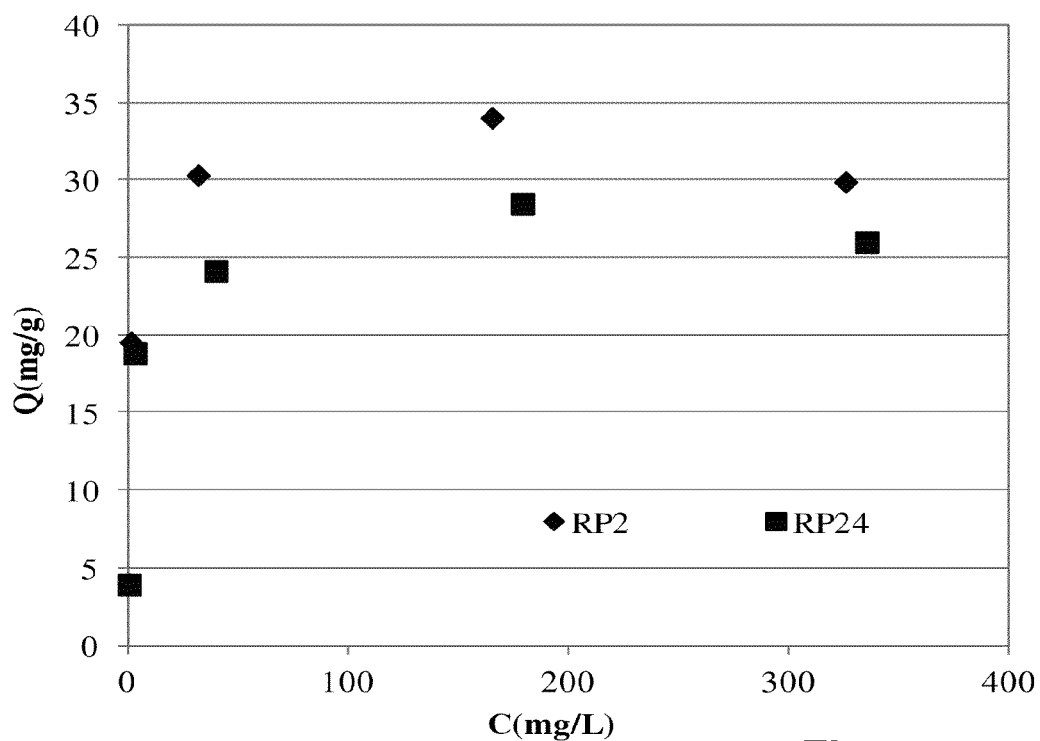
FIG. 23 is a graphical plot illustrating sulfate adsorption for two polypyrrole-grafted GAC samples.
Figure 24:
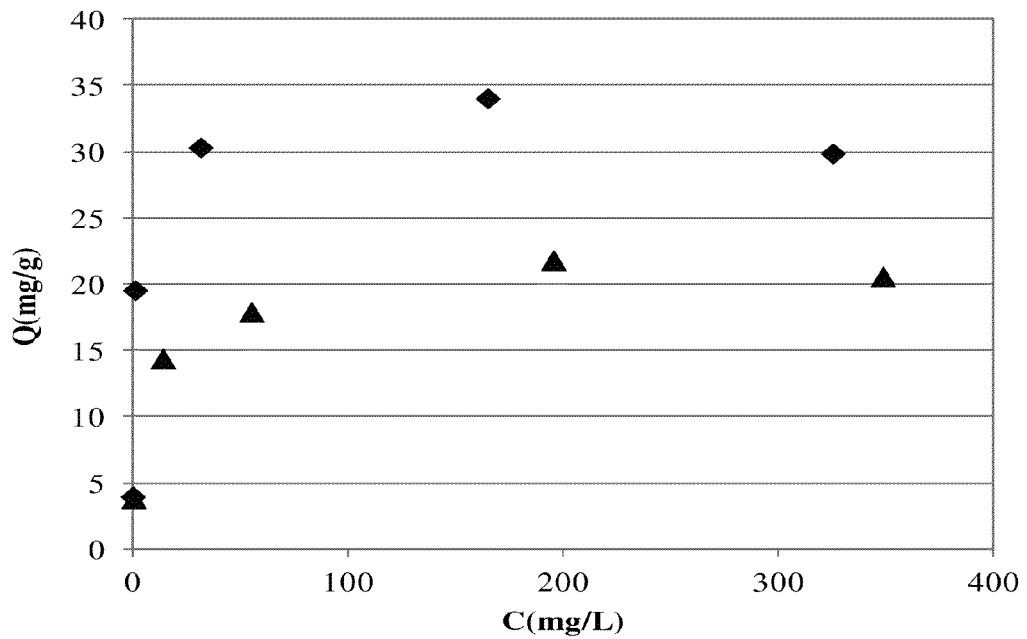
FIG. 24 is a graphical plot illustrating the effect of chlorine on sulfate adsorption for a polypyrrole-grafted GAC sample.

Two different Polypyrrole-grafted RGC(RP2 and RP24) were examined. The RP2 was grafted with polypyrrole at ambient temperature, whereas the RP24 was grafted at 40° C. RP2 provided a higher sulfate adsorption capacity than did RP24 (FIG. 23). This indicated that the higher reaction temperature did not improve the Ppy-grafted RGC ability to absorb sulfate. When using RP2 in the experiment, Cl$^-$ was also added to examine the competition with sulfate adsorption. The concentration of Cl$^-$ was the same as AMD which is 405 ppm. In this circumstance, the presence of Cl$^-$ affected sulfate adsorption: specifically, it decreased sulfate adsorption by one third (FIG. 24).

Figure 25:
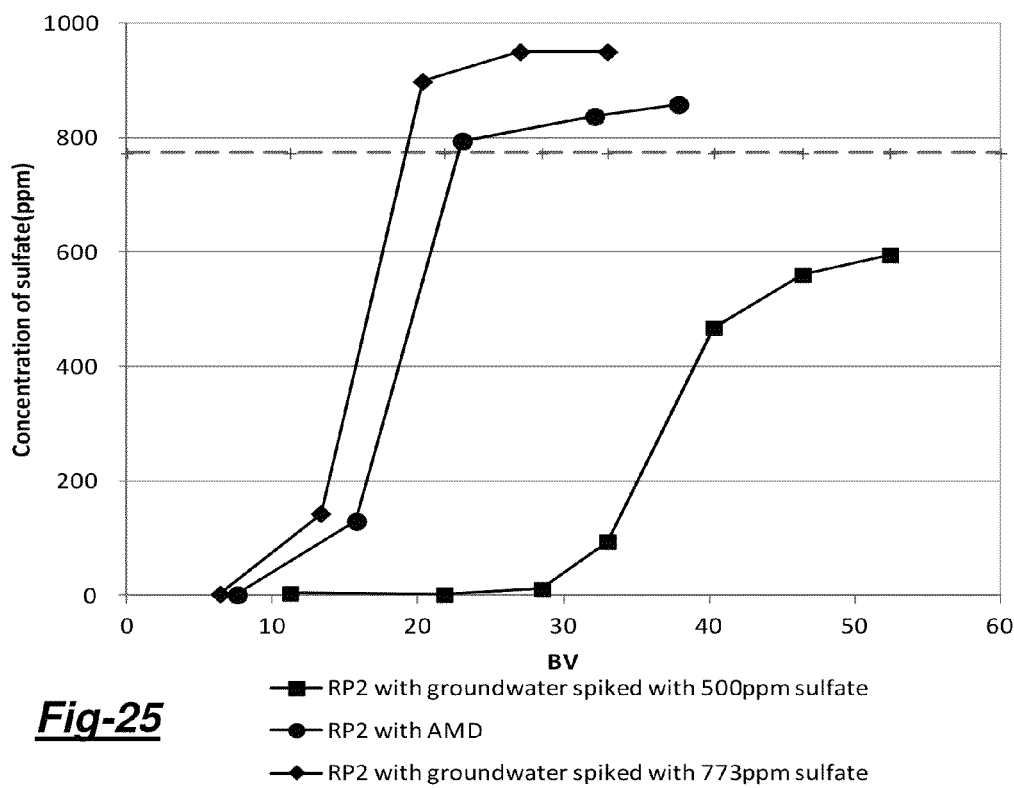
FIG. 25 is a graphical plot illustrating RSSCTs of sulfate breakthrough by a polypyrrole-grafted GAC sample.

RSSCT in accordance with the Standardized Proportional Mini-Column Adsorber protocol for sulfate were employed to predict the breakthrough of sulfate removal (FIG. 25). RP2 was used to remove sulfate from several water sources. Specifically, the influent to the RSSCTs was (a) Penn State groundwater (Water A) that had been spiked with 500 mg/L sulfate, and (b) Penn State groundwater (Water A) that was spiked with 773 mg/L sulfate, and (c) AMD water that was spiked with some species and that contained 773 mg/L sulfate (Water B). As observed in FIG. 25, RP2 provided 45 bed volumes to 500 mg/L sulfate breakthrough when treating Penn State groundwater that had been spiked with 500 mg/L sulfate (Water A). In comparison, a different batch of RP2 provided 20 bed volumes to 773 mg/L sulfate breakthrough when treating Penn State groundwater (Water A) that had been spiked with 773 mg/L sulfate. By computing the area over the curve, this means that the first of these captured 1.6 times as much sulfate as the second did. When treating Water B with 773 ppm sulfate, yet another batch of RP2 processed 23 bed volumes to 773 mg/L sulfate breakthrough. This RP2 captured 1.3 times more sulfate when processing Water B, than did the RP2 that had processed Penn State groundwater that had been spiked with 773 mg/L sulfate. On several occasions, the effluents from these RSSCTs were monitored for the presence of alkyl quaternary ammonium leaching by the Tsubouchi Two-Phase Titration dye protocol; and the results indicated that there was no alkyl quaternary ammonium that had leached, above the detection threshold of 0.1 to 0.2 mg/L.

The produced GAC/polypyrrole composites were employed as electrochemically regenerable sulfate adsorbents. The targeted application was removal of sulfate from acid mine drainage water as a pretreatment step for hydrofracturing water. Sulfate must be removed from hydrofracturing water in order to prevent precipitation of barium sulfate in the pores of fractures used during natural gas production from shale-gas formations. Acid mine drainage is a large potential source for hydrofracutring water, but no economically feasible technique exists to remove the 250-1000 ppm sulfate present. For the adsorption studies, 500 ppm (in Water A) or 773 ppm (in Water B) was chosen as a representative sulfate concentration. The experiments used either Water A that also contained 100 mg/L alkalinity as calcium carbonate and a total organic carbon content of greater than 0.5 mg/L; or Water B that also contained about 200 mg/L of alkalinity as calcium carbonate and hardness of about 300 mg/L as calcium carbonate.

Sulfate concentrations were measured using a Dionex DX 120 or ICS-1100 Ion Chromatography unit with AS40 and ASDV auto samplers, respectively. Both units were equipped with a 4-mm AS22 column, a 4-mm AG22 guard column, a 4-mm ASRS 300 ultra suppressor, and a DS3 detection stabilizer. When using degassed 36 mM NaOH eluent with a 25 µL loop, the method detection limit (MDL) was approximately 0.5 ppm. Standard calibration curves were run ($R^2$ greater than 0.997) for each new eluent produced (i.e. every 2-10 days).

The degree of sulfate removal enhancement was tested for a variety of polypyrrole tailored granular activated carbons (GAC) using adsorption isotherm according to the Adapted Batch Adsorption Isotherm protocol with sulfate in DI water. These experiments also employed RSSCTs with sulfate-spiked groundwater according to the Standardized Proportional Mini-Column Adsorber protocol for sulfate. The adsorption experiments were conducted with the as-polymerized GAC/polypyrrole composites, which were in their oxidized, positively charged form.

To regenerate these loaded GAC/polypyrrole composites, a reduction potential was applied which reduced the polypyrrole chain to its neutral, uncharged state in a 0.02 M NaCl electrolyte with a 2.5 pH. The desorbed sulfate anions could then diffuse into solution and be balanced by either protons or sodium cations. The extent of desorption was analyzed by X-ray Photoelectron Spectroscopy protocol (XPS) analysis so as to discern the S2p peak for adsorbed sulfate quantification.

The hardwood based GAC proved to be a better medium for loading polypyrrole films. For the hardwood GAC/polypyrrole composites, the maximum capacity observed increased from 6 mg sulfate/g GAC for the pristine GAC to 48 mg sulfate/g GAC with chemical polymerization after loading 1 M pyrrole onto the GAC surface. For the bituminous GAC/polypyrolle composites, the sulfate isotherm capacity increased from 5 mg sulfate/g GAC for the pristine GAC to 25 mg sulfate/g GAC with chemical polymerization using 1 M pyrrole. In addition, the sulfate removal capacity also increased with increasing pyrrole concentration until 1 M pyrrole. The bulk electrochemically polymerized GAC (0.25M pyrrole) enhanced removal but a lesser extent than the chemically polymerized composite at 0.3 M pyrrole. Higher concentrations during electrochemical polymerization are expected to further enhance adsorption, with other polymerization variations also possible for optimization (e.g. polymerization time, temperature, and current, pH).

Similar trends were discovered for RSSCTs employed with 500 mg/L sulfate spiked groundwater (Water A). The hardwood GAC/polypyrrole composites performed better than the bituminous GAC/polypyrrole composites. The composites greatly improved sulfate removal over pristine GACs in a column test, which reveals that the adsorption is not kinetically unfavorable for the short contact times necessary in a flow-through reactor. It was also noted that the composites were able to improve capacity without requiring a constant current to create a positive surface charge. Therefore the composites remain oxidized and could be regenerated either in situ or ex situ. Laboratory scale ex situ electrochemical regeneration protocols were employed and tested with XPS analysis of adsorbed and desorbed species, as well as nitrogen redox state.

Nearly two-thirds (65.4%) of the adsorbed sulfate was desorbed with ex situ reduction regeneration (in the bulk electrochemical process cell) of the spent hardwood GAC/polypyrrole 1M pyrrole composite after RSSCT, according to XPS quantification. Therefore, the majority of the sulfate adsorption sites appear to be redox active. Per XPS for N1s peak fitting, N=C imine species at 395-396 eV, N—H amine species at 397-398 eV, and electron deficient $N^+$ at 398-399 eV were assigned. Values of 12.94, 64.42, and 22.64 atomic % after RSSCT and 9.89, 60.21, and 31.21 atomic % after reduction regeneration were quantified for N=C, N—H, and $N^+$ species, respectively. Therefore, the expected doping level which was estimated from the $N^+/N$ ratio was one counter ion/positive charge for 3-5 pyrrole groups. Interestingly, this level appears to increase after reduction desorption. The presence of the $N^+$ peak on the reduced sample indicates that oxidation in water or air occurs quickly after reduction. The GAC/polypyrrole composite must have a constant potential applied in order to maintain a nuetral, reduced form. A small decrease in imine species was also observed after reduction.

Though some polypyrrole was detected on the external surface of the GAC grains using SEM, porosity analysis was needed to further examine the loading of the polypyrrole in the pores of the GAC. According to the values collected for the GAC/polypyrrole composite incremental pore volume as a function of pore width, all polymerized composite samples displayed some decrease (vs. pristine GAC) in the incremental volume between 4 and 100 Å. The amount of pore volume reduction increased with increasing pyrrole concentration during polymerization and was higher for chemical polymerization than for electrochemical polymerization at a given pyrrole concentration.

Bulk electrochemical polymerization with 0.1M pyrrole only showed a slight decrease in porosity, whereas 0.25 M pyrrole created a thicker film with an even greater decrease in porosity vs. pristine GAC. Chemical polymerization with 0.1M pyrrole produced a film with similar characteristics to the electrochemically polymerized film with 0.25 M pyrrole. Therefore, the protocol used herein for chemical polymerization created thicker films with higher polypyrrole loading than the protocol used herein for electrochemical polymerization at a given concentration. However, the time used for electrochemical polymerization was only 5 minutes versus the 6 hours used for chemical polymerization with ferric chloride initiation. The chemical polymerization with 1 M pyrrole created a very thick polypyrrole film which penetrated deep into the GAC porosity. In spite of the decreased porosity, the hardwood GAC/polypyrrole composite with 1 M pyrrole polymerization removed the highest amount of sulfate per mass during the adsorption isotherms and also sustained the second longest bed volumes to breakthrough during RSSCT, only exceeded by the 2M hardwood GAC/polypyrrole composite. The loss of porosity is then not detrimental to adsorption capacity or kinetics during flow through adsorption.

Figure 26:
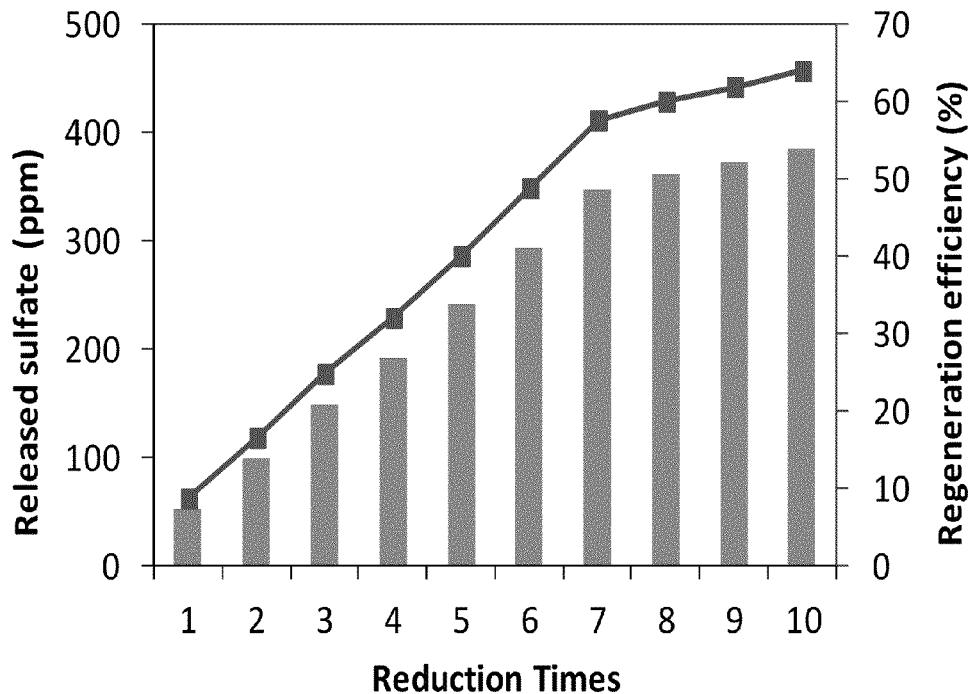
FIG. 26 is a graphical plot illustrating the effect of a −0.8 V reduction voltage on regeneration efficiency of a spent polypyrrole-grafted GAC sample.

The effect of reduction voltage on regeneration efficiency of spent RP1 was evaluated. In the first round of these experiments, we used a reduction voltage of −0.8 V. For this case, the concentration of released sulfate in electrolyte increased gradually from 50 ppm to 360 ppm, as the number of cycles of reduction increased from one to seven (FIG. 26). In comparison, the improvement of the released sulfate increased only gradually after the seventh reduction cycle. In addition, the regeneration efficiency of the spent hardwood GAC/polypyrrole 1M pyrrole GAC increased to nearly 65%, which indicated that most of the adsorbed sulfate on the spent GAC had been released by applying a potential of −0.8 V (vs Ag/AgCl) for 7 to 10 times. This initial result indicated that an electrochemical regeneration protocol for the spent tailored RGC could be feasible. It is noted that the positively charged nitrogen (in the polypyrrole) had become neutral under the negative potential, such that the adsorbed negatively charged sulfate on the spent GAC could be released thereafter.

Figure 27:
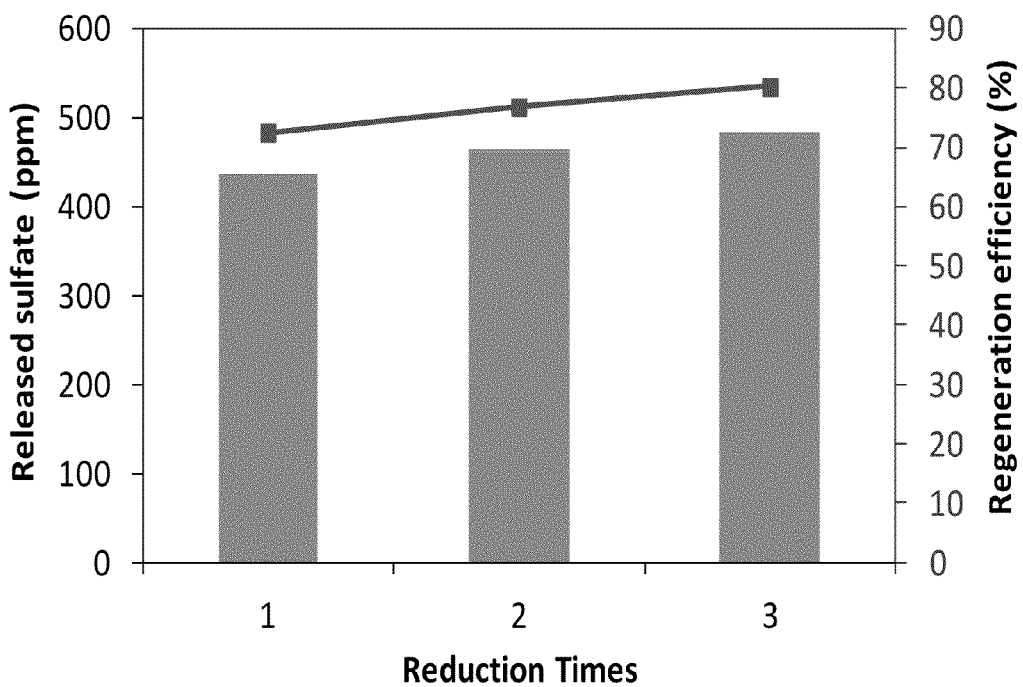
FIG. 27 is a graphical plot illustrating the effect of a −2.0 V reduction voltage on regeneration efficiency of a spent polypyrrole-grafted GAC sample.

In order to further improve the regeneration efficiency, a yet higher negative potential (−2 V) was employed that could preclude the influence of solution resistance, as depicted by FIG. 27 data. It was clear that the concentration of released sulfate in the electrolyte went up to 450 ppm for the first cycle of reduction; and this first cycle achieved 70% release of the sorbed sulfate. This value was even higher than that in FIG. 26, which exhibited 65% of the regeneration efficiency for RP1 after 10 cycles of reduction at potential of −0.8 V. This result indicated that the high potential that had been applied in the reduction step indeed improved the regeneration efficiency. Meanwhile, the regeneration efficiency of spent RP1 increased from 70% to 80% as the reduction was continued through three cycles.

Figure 28:
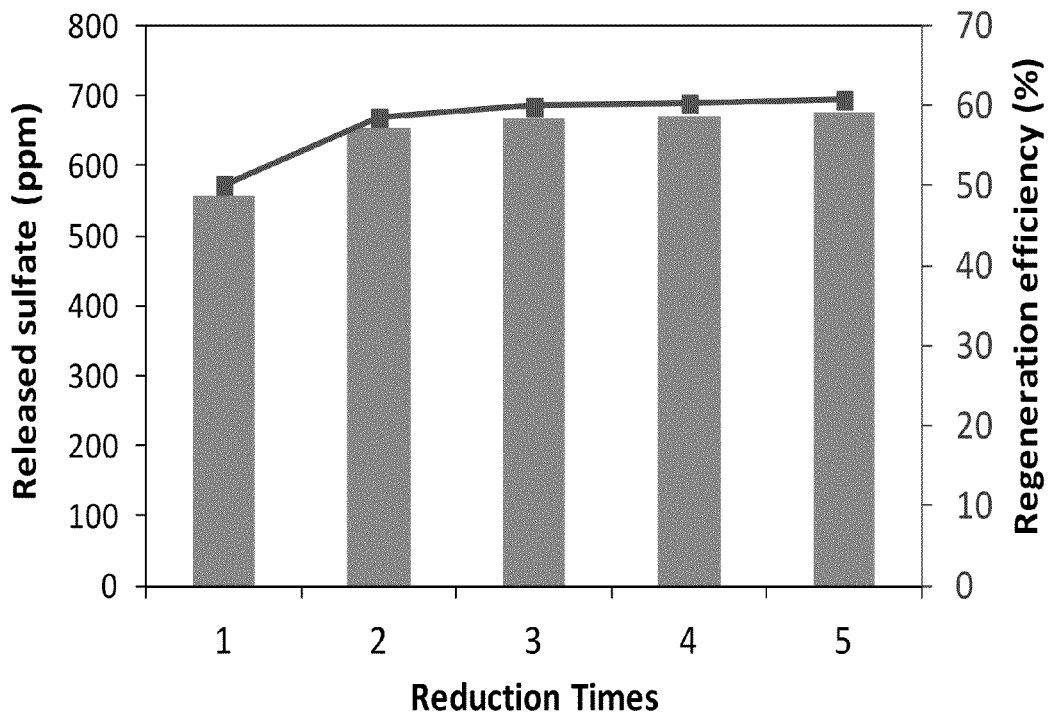
FIG. 28 is a graphical plot illustrating the effect of a −2.0 V reduction voltage on regeneration efficiency of a spent polypyrrole-grafted GAC sample.

According to the previous study on the performance of different carbons, RP2 exhibited the longest bed life in RSSCT when treated with AMD water or spiked groundwater. Therefore, the effect of reduction times on regeneration efficiency of spent RP2 was also evaluated in FIG. 28. The applied potential was −2 V. It was observed that the concentration of released sulfate in electrolyte increased gradually from 550 ppm to 650 ppm when the reduction times increased from one to five. Specifically, the improvement sulfate release increased only slightly after two reduction cycles, which means the reduction had occurred mostly in the first two reductions cycles. In addition, the regeneration efficiency of the spent RP2 increased to nearly 60% after the first two reductions cycles, which indicated that most of the adsorbed sulfate on the spent RP2 had been released by applying a potential of −2 V (vs Ag/AgCl.) through two cycles.

Figure 29:
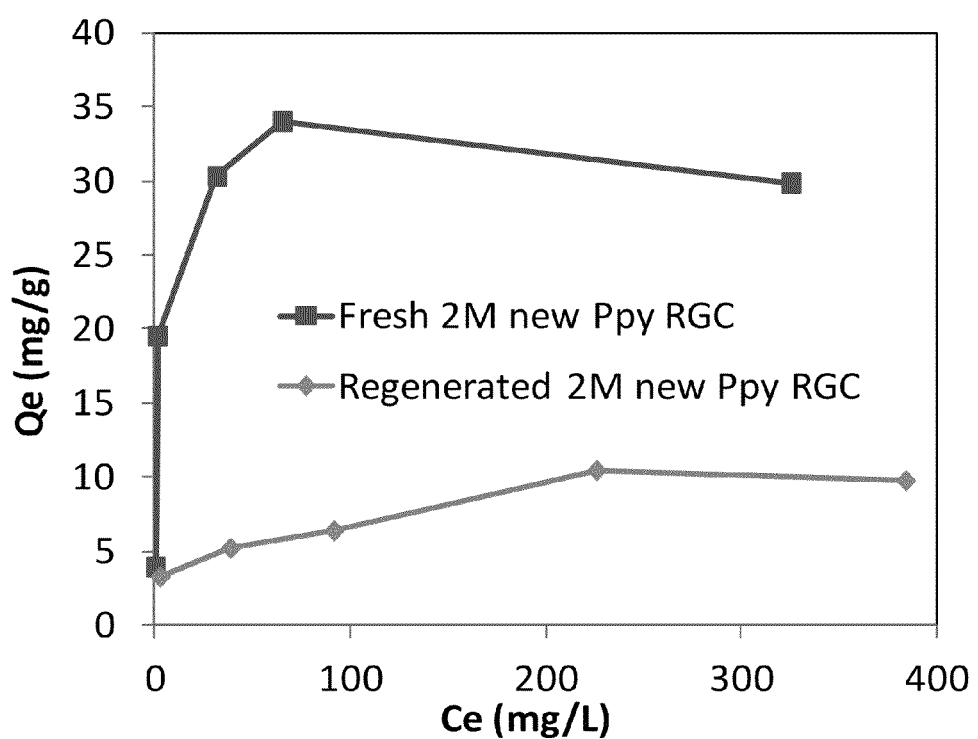
FIG. 29 is a graphical plot illustrating sulfate adsorption capacity of a regenerated spent polypyrrole-grafted GAC sample versus a fresh polypyrrole-grafted GAC sample.

After sulfate was no longer appreciably diffusing from the pores, this RP2 was reactivated. For reactivation, the RP2 was loaded back into the bulk electrochemical cell and oxidized at +0.9 V for 20 min in degassed 0.02 M NaCl. The regenerated RP2 was then analyzed by batch adsorption tests with 10 ppm to 400 ppm sulfate in DI water. The sulfate adsorption capacity of the regenerated RP2 decreased to 10 mg/g when the initial concentration of 400 ppm was applied (FIG. 29). This value was about one third of the Fresh RP2 (30 mg/g). It is noted that the regenerated RP2 after oxidation could only resorb 33% as much sulfate, whereas the regenerated RP2 after 2 times reduction could resorb 60% as much sulfate. It is noted that in these experiments, only the anionic-side of this tailored GAC media has been electrochemically reactivated. While not bound by theory, it is anticipated that the effectiveness will be even greater when we are regenerating both the anionic-side and cationic-side.

A process for removing a contaminant from a liquid can include providing an activated carbon material as disclosed above and passing the contaminated liquid through the material. In some instances, the activated carbon material can include a plurality of carbon grains that have been nitrogen tailored such that the material is operable to remove perchlorate from water. In addition, the material can purify at least 4,500 bed volumes of water having 20 ppb of perchlorate and reduce the perchlorate concentration to less than 4 ppb. In addition, the water can have an alkalinity greater than 100 mg/L as calcium carbonate and a total organic carbon content of greater than 0.5 mg/L. Finally, the nitrogen tailored activated carbon material leaches off less than 0.1 mg/L of a nitrogen-containing species attached thereto. In other instances, the activated carbon material can purify at least 14,000 bed volumes of water having an initial perchlorate concentration of 30 ppb and a final perchlorate concentration of less than 4 ppb.

In addition to the above, the instant application includes the material provided in the attached appendices. The invention is not restricted to the illustrative examples and embodiments described above. Methods, apparatus, compositions, and the like described herein are exemplary and not intended as limitations on the scope of the invention. Changes therein and others will occur to those skilled in the art and, as such, the specification and the appendices should be interpreted broadly.

List of References

1. Chen, W.; F. S. Cannon and J. R. Rangel-Mendez (2005a). Ammonia tailoring of GAC to enhance perchlorate removal. I: Characterization of $NH_3$ thermally tailored GACs. Carbon 43: 573-80.
2. Chen, W.; F. S. Cannon and J. R. Rangel-Mendez (2005b). Ammonia tailoring of GAC to enhance perchlorate removal. II: Perchlorate adsorption. Carbon 43: 581-90.
3. Moore, B. C.; F. S. Cannon, J. A. Westrick, D. H. Metz, C. A. Shrive, J. DeMarco and D. J. Hartman (2001). Changes in GAC pore structure during full-scale water treatment at Cincinnati: A comparison between virgin and thermally reactivated GAC. Carbon 39(6): 789-807.
4. Parette R, Cannon F S, Weeks K. Removing low ppb level perchlorate, RDX, and HMX from groundwater with CTAC-pre-loaded activated carbon. Water Research 2005; 39:4683-4692.
5. Tsubouchi M, Mitsushio H, Yamasaki N. Determination of Cationic Surfactants by Two-Phase Titration. Anal. Chem. 1981; 53: 1957-1959

We claim:
1. An activated carbon material comprising:
a plurality of carbon grains, where said plurality of carbon grains are operable to exhibit a current change that spans more than about 0.5 amps per gram of carbon grains from the highest-to-lowest points in a voltammogram cycle, while the electric potential spans less than 2.3 volts from the most positive to most negative points, as measured by a Cyclic Voltammetry protocol; and provided that the said plurality of carbon grains will sorb more than about 2.5 mg of oxyanion per gram of said carbon grains when the initial concentration is 10 mg/L of the oxyanion in deionized water, and 0.02 grams of said carbons grains are mixed in 23 mL water, per an Adapted Batch Adsorption Isotherm protocol.

2. The activated carbon material of claim 1, wherein the oxyanion used in an Adapted Batch Adsorption Isotherm protocol is perchlorate or sulfate, and wherein said carbon grains will sorb more than about 20 mg of oxyanion per gram of said carbon grains.

3. The activated carbon material of claim 1, wherein said plurality of carbon grains are operable to exhibit a current change that spans more than about 1.0 amps per gram of carbon material when the electric potential spans less than about 2.3 volts, as measured by a Cyclic Voltommetry protocol.

4. The activated carbon material of claim 1, wherein said activated carbon material is used for removing a contaminant from a liquid, and wherein said activated carbon material has:
an average mean pore volume per gram of more than about 0.10 mL per gram in the pore width range below about 15 angstroms wherein the average pore volume for a given pore widths is measured per an Argon Adsorption Density Functional Theory protocol;
nitrogen-tailored carbon grains having more than 2 atomic percent of a nitrogen-containing species; and at least about 0.15:1 atomic fraction of the nitrogen-containing species are at least one selected from the group NQ and N5, as measured per an X-ray Photoelecton Spectroscopy protocol which cannot detect hydrogen.

5. The activated carbon material of claim 1, wherein when fabricating a contactor from the nitrogen-tailored carbon grains, the contactor is operable to remove perchlorate to below 4 ppb for at least about 4,500 bed volumes of water, when the water has a perchlorate concentration of at least about 20 parts per billion (ppb) and the water also has an alkalinity greater than about 90 mg/L as calcium carbonate and a total organic carbon content of greater than about 0.4 mg/L, the perchlorate removal monitored per a Standardized Proportional Mini-Column Perchlorate Adsorber protocol.

6. The activated carbon material when fabricating a contactor of claim 5, wherein the nitrogen-containing species leaches off of the carbon grains to an amount of less than about 0.2 mg/L while perchlorate is removed from perchlorate-containing water flowing through the contactor, the leaching of the nitrogen-containing species monitored by a Tsubouchi Two-phase Titration protocol.

7. The activated carbon material of claim 1, wherein the carbon grains is derived from at least one material selected from the group consisting of lignite coal, subbituminous coal, bituminous coal, anthracite coal, coconut shells, lignin, hemicellulose, cellulose, kraft black liquor, cotton, softwood, hardwood, fruit pits, graphite, exfoliated graphite, switch grass, peat, carbonaceous textiles, and agricultural silage.

8. The activated carbon material of claim 1, wherein said material that has become activated carbon has been heat treated at a temperature greater than 250° C., and wherein the activated carbon material of claim 1, wherein the carbon grains have not been made into a solid by means of chemical vapor deposition of organic gases.

9. The activated carbon material of claim 1, wherein the carbon grains contain at least 0.3 atomic percent of a halogen selected from the group consisting of chloride, bromide, fluoride, iodide, and mixtures thereof.

10. The activated carbon material of claim 1, wherein the contactor is operable to remove anionic species, oxyanions, perchlorate, arsenate, arsenite, chromate, sulfate, sulfite, thiosulfate, polysulfides, sulfide, polythionates, hexathionate, pentathionate, tetrathionate, trithionate, dithionate, nitrate, bromate, bromide, chloride, fluoride bicarbonate, carbonate, uranyl carbonate, vanadate, selenate, silicate, selenite, and/or mixtures thereof.

11. The activated carbon material of claim 1, wherein the contactor removes organic species, natural organic matter, endocrine disrupting compounds, pharmaceutical and personal care products, acetate, methylene blue dye, congo red dye, geosmin, methylisoborneol, methyl tert butyl ether, chlorinated organic compounds, aliphatic organic compounds, aromatic organic compounds, ibuprofen, sulfamethoxazole, iopromide, dilantin, meprobabmat, diclofenac, naproxen, gemfibrozil, atrazine, N,N-Diethyl-meta-toluamide (DEET), acetaminophen, hodrocodone, carbamazepine, diazepam, caffeine, pentoxifyline, trimethoprim, striol, erythromycin, ethynylestradiol, testosterone, androstenedione, fluoxetine, stradiol, estrone, triclosan, tris (2-carboxeyethyl)phosphine (TCEP), progesterone, perfluorooctanoic acid, perfluorodecanoic acid, perfluorooctanesulfonic acid, and/or mixtures thereof.

12. The activated carbon material of claim 1, wherein the carbon grains contain nitrogen functionality and/or moieties that are selected from the group consisting of pyridine, pyridinium, quaternary ammonium, pyrrole, amines, imines, amides, imides, pyrrolic nitrogen, pyridinic nitrogen, primary amine, carboxamide, secondary amine, tertiary amine, primary ketimine, secondary ketimine, primary aldimine, secondary aldimine, azide, azo compounds, cyanate, isocyanate, nitrate, nitrile, isonitrile, nitrosooxy, nitro, nitroso, pyridyl, viologen, aniline, poly(aniline-co-o-aminophenol), hemoglobin, porphyrin, and/or mixtures thereof.

13. The activated carbon material of claim 1, wherein the carbon grains have a positive surface charge greater than about 0.05 milliequivalents/gram at pH 7, as measured by a Surface Charge Titration protocol.

14. The activated carbon material of claim 1, wherein the individual carbon grains have an average mean grain-width dimension that is between 5 microns and 3 millimeters with an aspect ratio less than or equal to 10, and wherein the carbon grains that have been wetted and confined horizontally, will then compress less than 20% when a water pressure of about 300 kPa is applied thereto.

15. The activated carbon material of claim 1, wherein the carbon grains are aggregated with other carbon grains via one or more biomaterial-derived binders.

16. The activated carbon material of claim 1, wherein the contactor is operable to remove at least 14,000 bed volumes of perchlorate down to below about 4 ppb from a native groundwater having at least 30 ppb perchlorate, an alkalinity greater than 90 mg/L as calcium carbonate and a total organic carbon concentration greater than 0.4 mg/L, as determined by a Standardized Proportional Mini-Column Adsorber protocol.

17. The activated carbon material of claim 1, provided that following said positive voltage oxidation per this protocol, the activated carbon exhibits an oxyanion-to-nitrogen ratio that exceeds about 0.04-to-1, whereas following said negative voltage reduction per this protocol, the activated carbon exhibits an oxyanion-to-nitrogen ratio that is less than about 0.005-to-1, as measured by an X-ray Photoelectron Spectroscopy protocol, and wherein said oxyanion does not contain nitrogen.

18. The activated carbon material of claim 1, wherein the nitrogen content is achieved by first exposing the parent carbon to an oxidizing agent that is selected from the group consisting of nitric acid, sulfuric acid, phosphoric acid, ozone, hydrogen peroxide, oxygen; provided that the activated carbon is then exposed to a hot ammonia gas at a temperature above about 300° C.; provided the activated carbon is then exposed to an alkyl halide wherein the alkyl group contains 1 to 20 carbons, and the halide is at least one selected from the group of: chloride, bromide, fluoride, and iodide.

19. The activated carbon material of claim 12, wherein the nitrogen functionality and/or moieties are achieved by adsorbing organic compounds onto the activated carbon that contain both a functional group that will undergo an epoxide reaction in high-pH conditions plus nitrogen functionality and/or moieties.

20. The activated carbon material of claim 1, wherein following an initial loading of oxyanion onto said activated carbon material, more than about 50 percent of the initial oxyanion sorption capacity can be restored by an electrochemical regeneration protocol that sequentially involves a reduction and oxidation step, wherein said oxyanion sorption capacity is measured by either an Adapted Batch Adsorption Isotherm Protocol or a Standardized Proportional Mini-Column Adsorber protocol.

21. The activated carbon material of claim 1, where said plurality of carbon grains are operable to exhibit a current change that spans more than about 0.5 amps per gram of carbon grains from the highest-to-lowest points in a voltammogram cycle, while the electric potential spans less than 2.3 volts from the most positive to most negative points, as measured by a Cyclic Voltammetry protocol, provided that such exhibition of current change can be maintained through at least 50 cycles of a Cyclic Voltammetry protocol.

22. An activated carbon material for removing a contaminant from a liquid, said activated carbon material comprising:
   a contactor made from a plurality of carbon grains, said contactor operable to remove perchlorate down to no more than 4 ppb perchlorate from at least 10,000 bed volumes of perchlorate-contaminated water having an alkalinity more than about 90 mg/L as calcium carbonate and more than about 0.4 mg/L total organic carbon and about 20 parts per billion or more of perchlorate, as monitored per a Standardized Proportional Mini-Column Perchlorate Adsorber protocol, and provided that nitrogen-containing species do not leach off of the activated carbon grains above a concentration of about 0.2 mg/L, as monitored by a Tsubouchi Two-phase Titration method.

* * * * *